(12) United States Patent
Baiyor et al.

(10) Patent No.: US 6,366,660 B1
(45) Date of Patent: *Apr. 2, 2002

(54) APPARATUS, METHOD AND SYSTEM FOR PROVIDING VARIABLE ALERTING PATTERNS FOR MULTIPLE LEG TELECOMMUNICATION SESSIONS

(75) Inventors: Robert John Baiyor; Deborah Thomas Earl, both of Naperville; Harold Robert Smith, Jr., Oakbrook Terrace; Thomas Dale Strom, Naperville, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/342,499

(22) Filed: Jun. 29, 1999

(51) Int. Cl.$^7$ ................................................ H04M 3/42
(52) U.S. Cl. ............................ 379/211.01; 379/202.01; 379/211.02; 379/211.03; 379/211.04
(58) Field of Search ..................... 379/202.01, 211.02, 379/211.03, 211.04, 219, 196, 233, 49

(56) References Cited

U.S. PATENT DOCUMENTS

| | | | | |
|---|---|---|---|---|
| 4,700,374 A | * | 10/1987 | Bini ............................ | 455/456 |
| 5,166,972 A | * | 11/1992 | Smith ........................... | 379/49 |
| 5,206,901 A | * | 4/1993 | Harlow et al. ........... | 379/211.01 |
| 5,329,578 A | * | 7/1994 | Brennan et al. .......... | 379/88.19 |
| 5,430,791 A | * | 7/1995 | Feit et al. ................. | 379/88.01 |
| 5,454,032 A | * | 9/1995 | Pinard et al. ............ | 379/167.01 |
| 5,502,762 A | * | 3/1996 | Andrew et al. .......... | 379/202.01 |
| 5,802,160 A | * | 9/1998 | Kugell et al. ............ | 379/211.01 |
| 6,005,930 A | * | 12/1999 | Baiyor et al. ........... | 379/211.01 |
| 6,009,159 A | * | 12/1999 | Baiyor et al. ........... | 379/211.01 |
| 6,115,461 A | * | 9/2000 | Baiyor et al. ........... | 379/211.01 |

* cited by examiner

*Primary Examiner*—Ahmad F. Matar
*Assistant Examiner*—Bing Bui
(74) *Attorney, Agent, or Firm*—Nancy R. Gamburd

(57) ABSTRACT

A system, apparatus and method are disclosed which provide variable alerting patterns for multiple leg telecommunication sessions, such as for providing concurrent alerting, sequential alerting, pyramid alerting or cascade alerting, of outgoing call legs for a flexible alerting service. The preferred system includes a home location register coupled to a mobile switching center. The home location register has, stored in a memory, a plurality of secondary directory numbers associated with a primary directory number, such as an ANSI compatible pilot directory number, and for each secondary directory number of the plurality of secondary directory numbers, further stored in the memory a corresponding timing delay parameter, a corresponding no answer time parameter, and a corresponding no answer termination trigger. Variation of the various corresponding timing delay parameters and no answer time parameters produces the variable alerting patterns. The mobile switching center has an interface for receiving an incoming call leg designating the primary directory number and for differentially processing and routing each outgoing call leg associated with each secondary directory number, of the plurality of secondary directory numbers, according to its corresponding timing delay parameter, to form a plurality of outgoing call legs; and unless an outgoing call leg of the plurality of outgoing legs has been answered, for alerting each outgoing call leg for a time period of its corresponding no answer time parameter and, upon an expiration of the time period, for treating each outgoing call leg according to its corresponding no answer termination trigger.

47 Claims, 11 Drawing Sheets

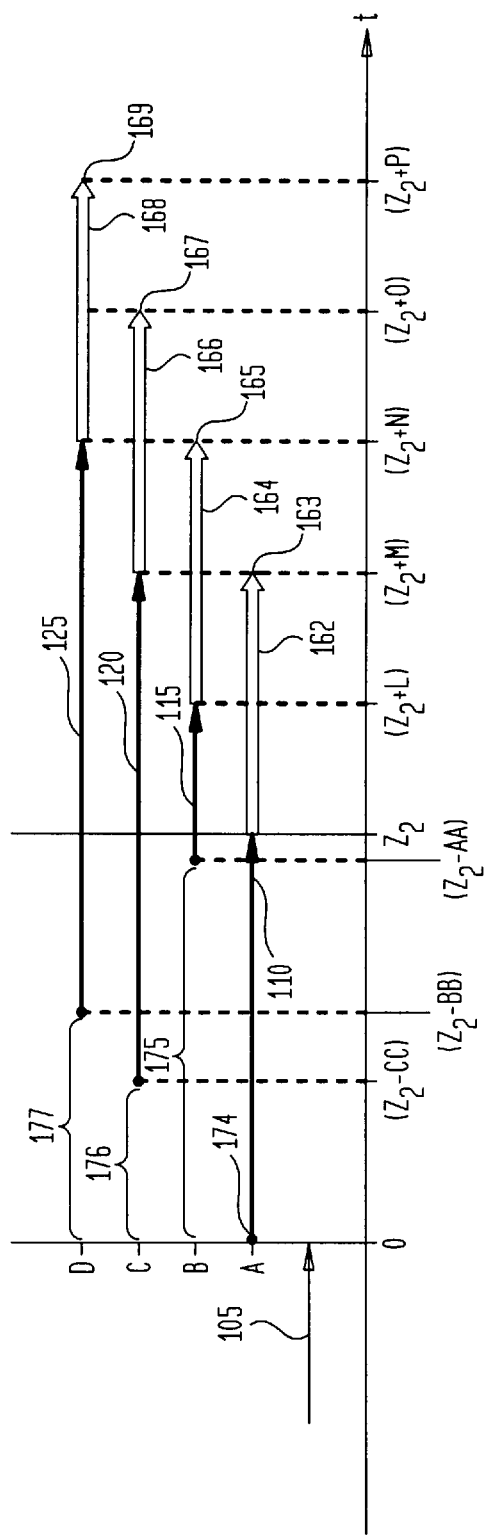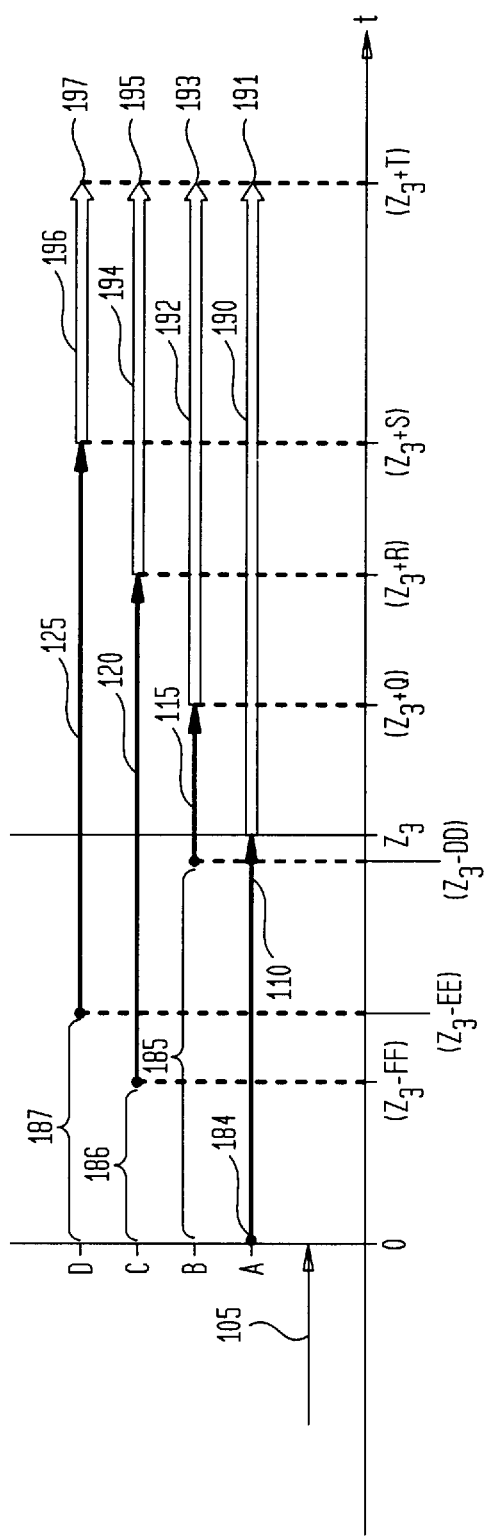

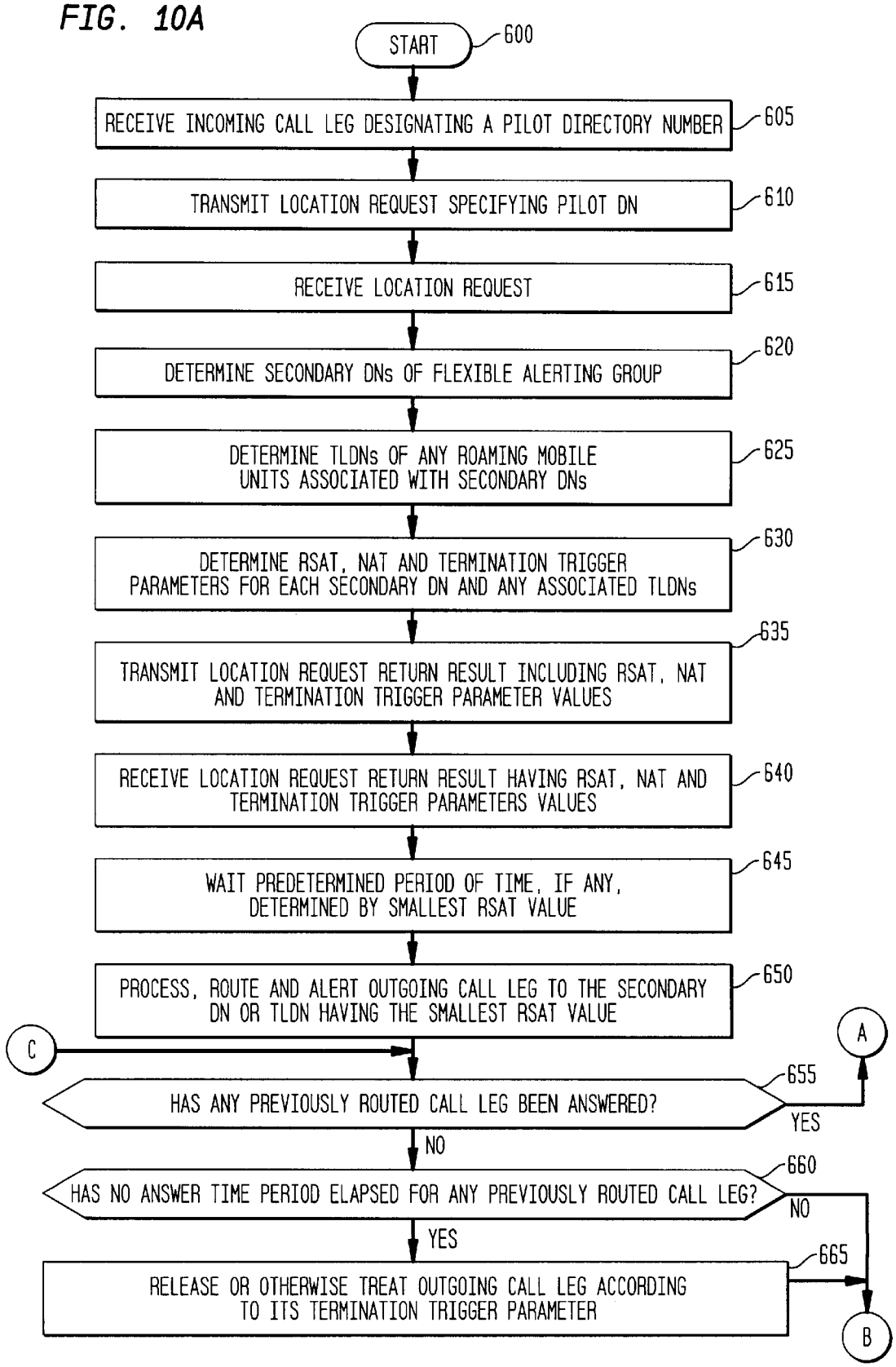

APPARATUS, METHOD AND SYSTEM FOR PROVIDING VARIABLE ALERTING PATTERNS FOR MULTIPLE LEG TELECOMMUNICATION SESSIONS

CROSS-REFERENCE TO RELATED APPLICATIONS

This application is related to Baiyor et al., U.S. patent application Ser. No. 09/094,837, entitled "Apparatus, Method And System For Controlling The Start Of Alerting Of Multiple Leg Telecommunication Sessions", filed Jun. 15, 1998, commonly assigned to Lucent Technologies, Inc., and incorporated by reference herein, with priority claimed for all commonly disclosed subject matter (the "first related application").

This application is related to Baiyor et al., U.S. patent application Ser. No. 09/097,334, entitled "Apparatus, Method And System For Controlling Secondary Treatment By a Distant Switch Of Multiple Leg Telecommunication Sessions", filed Jun. 15, 1998, commonly assigned to Lucent Technologies, Inc., and incorporated by reference herein, with priority claimed for all commonly disclosed subject matter (the "second related application").

This application is related to Baiyor et al., U.S. patent application Ser. No. 09/097,527, entitled "Apparatus, Method And System For Providing Information To A Called Party In Multiple Leg Telecommunication Sessions", filed Jun. 15, 1998, commonly assigned to Lucent Technologies, Inc., and incorporated by reference herein, with priority claimed for all commonly disclosed subject matter (the "third related application").

FIELD OF THE INVENTION

The present invention relates in general to telecommunication systems, and more particularly, to an apparatus, method and system for providing variable alerting patterns for multiple leg telecommunication sessions.

BACKGROUND OF THE INVENTION

With the advent of increasingly sophisticated telecommunication services, various proposals have been made to allow a single call, incoming to a telecommunication switch, to branch into multiple, independent outgoing calls (or legs) to different called parties, during the same period of time. These incoming and multiple outgoing calls may be wireline, such as PSTN (public switched telephone network), ISDN (integrated services digital network), or T1/E1 wireline calls, or may be wireless, such as cellular calls or other mobile service communications.

Once such proposal is included in the ANSI-41 specification promulgated by the American National Standards Institute for wireless telecommunication, such as cellular communication, and is referred to as "flexible alerting". The ANSI-41 flexible alerting specification, however, does not include any specific directions or guidelines for implementation and control of such independent, concurrent outgoing multiple leg calls.

Other prior art systems also do not provide for multiple outgoing calls, to different parties, during the same time period. Rather, such known systems provide for individual, sequential calls rather than multiple, concurrent outgoing calls. For example, the incoming call may first alert a home telephone having a first directory number; if the first call is unanswered, that call leg is dropped and a second telephone having a different, second directory number is alerted, such as a cellular phone. If the second call is unanswered, that second call leg is dropped, and a third line having a third directory number is alerted, such as a pager.

As a consequence, a need remains for an apparatus, method and system to implement and control multiple, independent outgoing communication sessions (or call legs) originating from a single incoming call leg. Such an apparatus, method and system should also provide for variable alerting patterns of the multiple, independent outgoing communication legs or links, such as providing concurrent or simultaneous alerting, sequential alerting, cascade alerting, or pyramid alerting. Such an apparatus, method and system should be user friendly and user transparent. Such an apparatus, method and system should also be dynamic and responsive to changing environmental and user conditions which may arise in wireless or wireline communication systems.

SUMMARY OF THE INVENTION

A system, apparatus and method are illustrated for providing variable alerting patterns for multiple leg telecommunication sessions, such as for concurrent alerting, sequential alerting, cascade alerting, or pyramid alerting of outgoing call legs for a flexible alerting service. The preferred system embodiment includes a home location register coupled to a mobile switching center. In the preferred system embodiment, a mobile switching center receives an incoming call leg designating a primary directory number ("DN"). A subscriber or other user of flexible alerting or other multi-leg communications, typically predefines a group of other directory numbers, referred to herein as secondary DNs, which are to be associated with the primary DN, such that when a call is placed to the primary DN, all of the secondary DNs are alerted. Such a list or grouping may be referred to as a flexible alerting group, or more broadly as an alerting group. The incoming call to the primary DN is then to be processed by a mobile switching center, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

To provide for variable alerting patterns for these multiple outgoing call legs, in accordance with the present invention, the home location register has, stored in a memory, a plurality of secondary directory numbers associated with the primary directory number, such as an ANSI compatible pilot directory number. For each secondary directory number of the plurality of secondary directory numbers, the home location register further has stored in the memory three corresponding parameters: first, a corresponding timing delay parameter, referred to as a ring start adjustment time ("RSAT") parameter; second, a corresponding no answer time ("NAT") parameter; and third, a corresponding termination trigger (no answer termination trigger) parameter. When the mobile switching center receives an incoming call leg designating the primary directory number, it requests this information from the home location register, consisting of the listing of secondary DNs and their corresponding RSAT, NAT, and termination trigger parameters. The mobile switching center then differentially processes and routes each outgoing call leg associated with each secondary directory number, of the plurality of secondary directory numbers, according to its corresponding RSAT, NAT, and termination trigger parameters.

The timing delay (or RSAT) parameter is utilized to independently control the start of alerting of each outgoing call leg, providing any desired variation concerning when each outgoing leg will begin to be alerted. The no answer time (or NAT) parameter is utilized, also on an independent and individual basis, to determine how long each of these outgoing call legs will continue to be alerted prior to being answered, if answered at all. If and when an individual outgoing call leg has remained unanswered (and its no answer time period has elapsed or expired), the termination trigger parameter is utilized to determine how that outgoing call leg is to be treated or handled, such as whether it will be released or torn down, or whether further instructions will be requested.

In accordance with the present invention, varying each of these parameters, independently for each outgoing call leg, provides corresponding variable alerting patterns. In the preferred embodiment, these patterns include concurrent or simultaneous alerting, sequential alerting, cascade alerting, and pyramid alerting.

More specifically, the mobile switching center waits an initial predetermined period of time, determined by a smallest timing delay parameter of a plurality of corresponding timing delay parameters, and following the initial predetermined period of time, the mobile switching center routes a first outgoing call leg to a first secondary directory number, of the plurality of secondary directory numbers, corresponding to the smallest timing delay parameter, Next, the mobile switching center waits a subsequent predetermined period of time, determined by a next smallest timing delay parameter of the plurality of corresponding timing delay parameters, and following the subsequent predetermined period of time, the mobile switching center routes a outgoing call leg to another secondary directory number, of the plurality of secondary directory numbers, corresponding to the next smallest timing delay parameter. Unless a previously routed outgoing call leg has been answered, the mobile switching center continues such corresponding waiting and routing, according to the various timing delay parameters, until all outgoing call legs corresponding to the plurality of secondary directory numbers have been routed.

Concurrently with such differential processing and routing, the mobile switching center monitors each outgoing call leg, and allows each such outgoing call leg to continue to be alerted either until one of the outgoing call legs has been answered, or until the corresponding no answer time has expired for the particular outgoing call leg. For example, depending upon the selected alerting pattern, such as for sequential alerting, following expiration of the NAT for a first outgoing call leg, a second outgoing call leg may begin to be alerted (with a corresponding RSAT), and following expiration of the NAT for the second outgoing call leg, a third outgoing call leg may begin to be alerted (with corresponding RSAT). Also concurrently, following the expiration (if any) of the various NAT parameters, the no answer termination trigger (equivalently referred to herein as a "termination trigger") parameters are utilized to determine how each such corresponding outgoing call leg is to be treated.

In the various embodiments, for each outgoing call leg, the timing delay parameter and the no answer time parameter are contained as parameters within a Termination List of a modified ANSI compatible LocationRequest RETURN RESULT. To obtain the listing of secondary DNs and their parameters (corresponding to the primary DN) the mobile switching center transmits an ANSI compatible LocationRequest to the home location register. The home location register transmits to the mobile switching center a modified ANSI compatible LocationRequest RETURN RESULT containing, for each secondary directory number of the plurality of secondary directory numbers, the corresponding RSAT, NAT, and Termination Trigger parameters. In addition, the home location register may also transmit an ANSI compatible RoutingRequest to a serving mobile switching center for determining a temporary local directory number for a roaming mobile unit corresponding to a secondary directory number of the plurality of secondary numbers, and will then receive an ANSI compatible RoutingRequest RETURN RESULT from the serving mobile switching center.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 4 is a graphical diagram illustrating a cascade alerting timing scheme for multiple outgoing communication sessions in accordance with the present invention.

FIG. 5 is a graphical diagram illustrating a pyramid alerting timing scheme for multiple outgoing communication sessions in accordance with the present invention.

DETAILED DESCRIPTION OF THE INVENTION

Figure 1A:
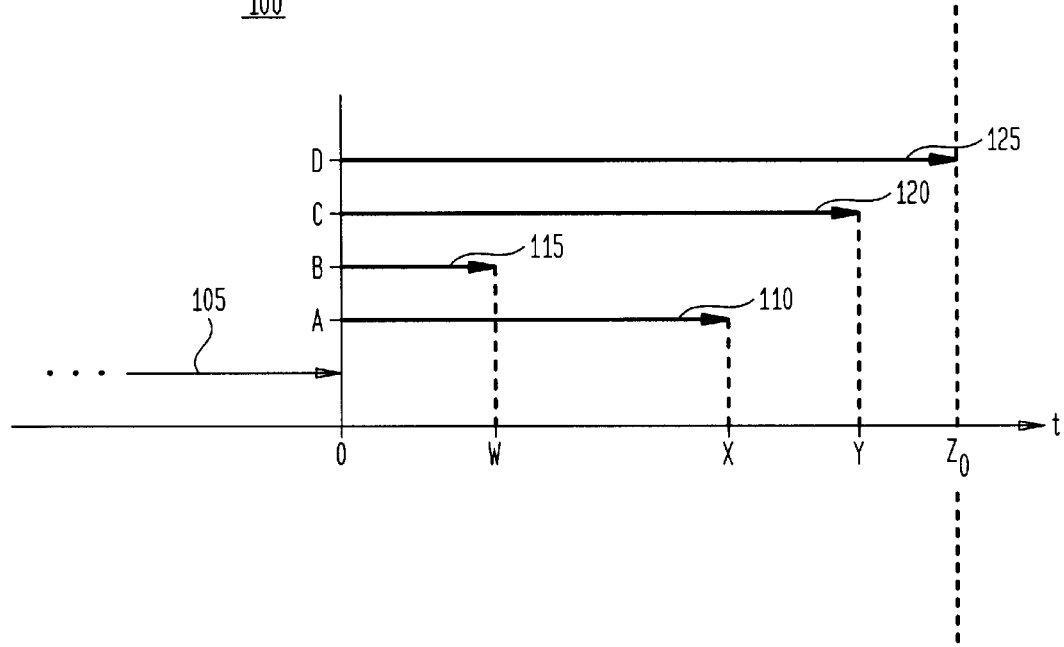
FIG. 1A is a graphical diagram illustrating a timing scheme for alerting of multiple outgoing communication sessions commencing upon processing of an incoming call to a network switch, in accordance with the prior art.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to implement and control multiple, independent outgoing communication sessions (or call legs) originating from a single call leg incoming to a telecommunication switch. In accordance with the present invention, an apparatus, method and system implement and control such multiple, independent outgoing communication sessions. More particularly, the apparatus, method and system in accordance with the present invention provide for variable alerting patterns of these multiple, independent outgoing communication sessions, such as providing concurrent or simultaneous alerting, sequential alerting, cascade alerting, and pyramid alerting. The apparatus, method and system of the present invention also are user friendly and user transparent. In addition, the apparatus, method and system are dynamic and responsive to changing environmental and user conditions which may arise in wireline or wireless communication systems, such as potentially changing locations of mobile telephones.

As mentioned above, the new ANSI-41 specification provides a communications standard for flexible alerting for wireless communications, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications, typically predefines a group of other directory numbers, referred to herein as secondary DNs, which are to be associated with the pilot or primary DN, such that when a call is placed to the primary DN, all of the secondary DNs are alerted. Such a list or grouping may be referred to as a flexible alerting group, or more broadly as an alerting group or a secondary DN group, (and may also be referred to as a termination group or list when incorporated in certain response messages discussed below). The incoming call to the pilot DN is then to be processed by a mobile switch, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

Such flexible alerting or other multi-leg communication may be useful, for example, in businesses involving sales, repairs, or dispatching services. Such flexible alerting may also be useful for other business and personal uses, such as multiple calls to a home, office, and cellular telephone. For example, a child may call a single DN, namely, a parent's pilot DN, which will then alert the telephones at all the associated directory numbers or lines defined in the parent's alerting group or list, such as their home DN, business office DN, home office DN, and cellular or other mobile telephone DN. Presuming the parent is present, the parent will be alerted at any and all of these locations from the placement of a single telephone call.

The ANSI-41 specification, however, does not address the timing or control of these multiple outgoing calls. Rather, the ANSI-41 specification merely addresses and requires that an incoming call to a pilot DN be routed to the associated, secondary DNs of the flexible alerting group, with the calling party ultimately connected to the answering party. As an example of this lack of timing control, FIG. 1A is a graphical diagram illustrating a potential timing scheme 100, under the ANSI-41 specification, for alerting of multiple outgoing communication sessions commencing upon processing of the incoming call to a network (mobile) switch. This lack of timing control (illustrated in FIG. 1A) is also implicit in the various references cited in the related applications, such as Kugell et al. U.S. Pat. No. 5,802,160, which begin simultaneous processing of alerting for all outgoing call legs, without any intermediate delay and differential processing of the present invention, and without regard for the timing of when alerting begins for each outgoing call leg.

As illustrated in FIG. 1A, an incoming call 105 is received and processed by a network switch when time (t) equals zero. Following processing of the incoming call leg, at t=0, call placement and other processing commences at the same time for four independent outgoing communication sessions A, B, C and D. As illustrated, such communication sessions typically have different processing times, namely, processing times (illustrated as lines having reference numbers 110, 115, 120 and 125, respectively), having respective durations of X, W, Y and $Z_0$. Such different processing times may typically result because each outgoing call is independent and is generally placed to a different location. For example, outgoing call B may be placed to a directory number on the same network switch, and as a consequence, has the comparatively shortest processing duration 115, with alerting of its corresponding telephone(s) commencing at time t=W. Outgoing call A may be routed through a PSTN and/or an ISDN system, and has the next shortest processing duration 110, with alerting commencing at time t=X (with X>W). Outgoing call C may be routed through multiple PSTN, ISDN or wireless nodes, resulting in a longer processing duration 120, with alerting commencing at time t=Y (with Y>X). Lastly, the fourth outgoing call D also may be routed through multiple nodes, which may be any combination of PSTN, satellite, or wireless nodes, or may require an additional mobile paging message to locate a mobile telephone, resulting in the comparatively longest processing time 125, with alerting commencing at time t=$Z_0$ (with $Z_0$>Y).

One of the difficulties associated with the timing or alerting scheme 100 of the prior art, as illustrated in FIG. 1A, is that different alerting times W, X, Y, and $Z_0$ result, primarily due to the different processing time periods required to place these independent calls to different locations or different directory numbers, with potentially different network requirements. For many applications, these different alerting times are undesirable and may be problematic. For example, if these calls are placed as part of a dispatching service, outgoing call B is alerted first, while outgoing call D is alerted last. This may result in B answering calls before D is even alerted, or may simply result in B answering or receiving more calls than D. These situations may both overload B with excess calls and deprive D of needed calls, and may result in an inefficient allocation of resources. Such different alerting times may also be noticeable to a subscriber, resulting in possible consumer irritation if their PSTN or PBX line rings considerably earlier than their cellular telephone.

As a consequence, control over the timing of the alerting of these independent, multiple leg calls is highly desirable. In accordance with the first related application, such timing control is provided to result in concurrent or simultaneous alerting of these independent, multiple leg calls. As disclosed in the first related application, the present invention utilizes a new timing delay parameter, referred to as a ring start adjustment time ("RSAT") parameter, to individually and independently delay the start of processing of each outgoing leg of the multiple outgoing legs. Such a timing delay parameter is not provided in and is wholly independent of the ANSI-41 specification or any other telecommunications standard or specification. This new timing delay parameter is also independent of any particular network embodiment, and may be utilized to synchronize the alerting of multiple telephones or lines of any type, including wireline or wireless.

Figure 1B:
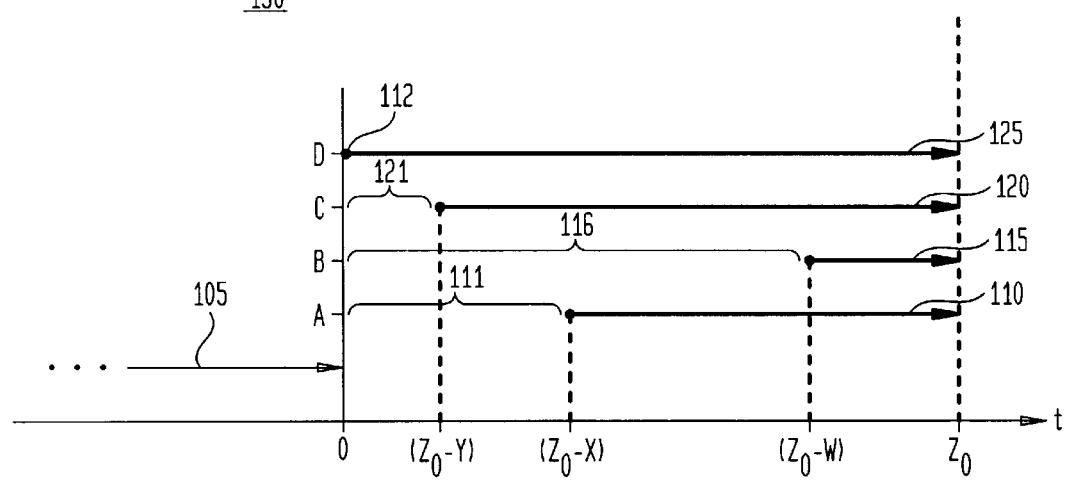
FIG. 1B is a graphical diagram illustrating a timing scheme for concurrent alerting of multiple outgoing communication sessions in accordance with the invention disclosed in the first related application.

FIG. 1B is a graphical diagram illustrating such a timing scheme 150 for alerting of multiple outgoing communication sessions utilizing multiple, independent timing delay parameters to provide control over the start of alerting, and more specifically concurrent alerting, in accordance with the invention disclosed in the first related application. As illustrated in FIG. 1B, an incoming call 105 is received and processed by a network switch when time (t) equals zero (t=0). Following processing of the incoming call leg, at t=0, call placement and other processing commences at variable times for the four independent outgoing communication sessions A, B, C and D. To achieve concurrent or simultaneous (approximately) alerting at time $t=Z_0$ for all communication sessions, in accordance with the present invention, an individual timing delay parameter referred to as an "RSAT" is utilized to delay the processing and corresponding alerting of each leg of the multiple outgoing legs. As illustrated in FIG. 1B, the processing of call leg D, which has the comparatively greatest processing time 125, commences immediately at time t=0, utilizing a first time delay parameter 112 equal to zero (RSAT=0), such that alerting of call leg D will then commence at time $t=Z_0$ (approximately). Next, utilizing a second timing delay parameter 121 equal to $(Z_0-Y)$, (RSAT=$(Z_0-Y)$), the processing of call leg C (having processing time 120) does not commence immediately at time t=0 but instead commences at time $t=(Z_0-Y)$, with $(Z_0-Y)$ greater than zero, such that alerting of call leg C will also commence at time $t=Z_0$ (approximately). Next, utilizing a third timing delay parameter 111 equal to $(Z_0-X)$, (RSAT=$(Z_0-X)$), the processing of call leg, A (having processing time 110) does not commence immediately at time t=0 or at time $t=(Z_0-Y)$, but instead commences at time $t=(Z_0-X)$, with $(Z_0-X)$ greater than $(Z_0-Y)$, such that alerting of call leg C will also commence at time $t=Z_0$ (approximately). Lastly, utilizing a fourth timing delay parameter 116 equal to $(Z_0-W)$, (RSAT=$(Z_0-W)$), the processing of call leg B (having processing time 115) does not commence immediately at time t=0, at time $t=(Z_0-Y)$ or at time $t=(Z_0-X)$, but instead commences at time $t=(Z_0-W)$, with $(Z_0-W)$ greater than $(Z_0-X)$, such that alerting of call leg B will also commence at time $t=Z_0$ (approximately).

As illustrated above, utilizing an independent timing delay parameter for each outgoing leg of the plurality of outgoing call legs, control over the start of alerting of each outgoing call leg is provided, and as illustrated, such alerting will commence at approximately the same time. Approximate (rather than exact) control is expected (such as approximately concurrent or simultaneous alerting), as call processing times (reference numbers 110, 115, 120 and 125) may also vary from time to time and from call to call, depending upon network conditions (such as congestion), and depending upon other environmental conditions (such as mobile telephones roaming in or out of a given service area at any given time). In addition, depending upon how the timing delay parameters are derived or implemented by a service provider, corresponding timing delays or other timing adjustments also may not be exact, again resulting in approximate control (such as approximate concurrent alerting) in actual practice or usage.

As may be apparent from a comparison of FIG. 1B with FIG. 1A, in accordance with the invention of the first related application, for concurrent alerting, those outgoing call legs having a comparatively longer processing and routing time will have a comparatively shorter timing delay parameter. For example, to provide for concurrent alerting at time $t=Z_0$, outgoing call leg D, which has the comparatively longest processing time (reference number 125), correspondingly has the comparatively shortest timing delay parameter 112 of zero. In contrast, also to provide concurrent alerting at time $t=Z_0$, outgoing call leg B, which has the comparatively shortest processing time (reference number 115), correspondingly has the comparatively longest timing delay parameter 116 of $(Z_0-W)$. As a consequence, for concurrent alerting, a timing delay parameter may be viewed as inversely proportional to the processing and routing time of its corresponding outgoing call leg. A given timing delay parameter, of course, will have other values and proportional relationships depending upon the type of control desired to be implemented, in addition to a concurrent alerting type of control, as discussed in greater detail below.

In addition, the values for the timing delay parameters may have two different forms in the preferred embodiment. The values discussed above have been relative time delay parameters, providing an increment or period of time relative to the start of outgoing call leg routing (at time t=0). Values for time delay parameters may also be expressed in an absolute form, such as 10:43:02 a.m., 10:43:04 a.m., and so on, thereby also providing synchronizing information for the various outgoing call legs. As used herein, however, values for the timing delay parameters shall be considered relative to the start of processing of outgoing call routing (at time t=0) or, as discussed below, a (second) portion of a timing delay parameter relative to a start of alerting of a first outgoing call leg (e.g., at a time $t=Z_0$).

Figure 2:
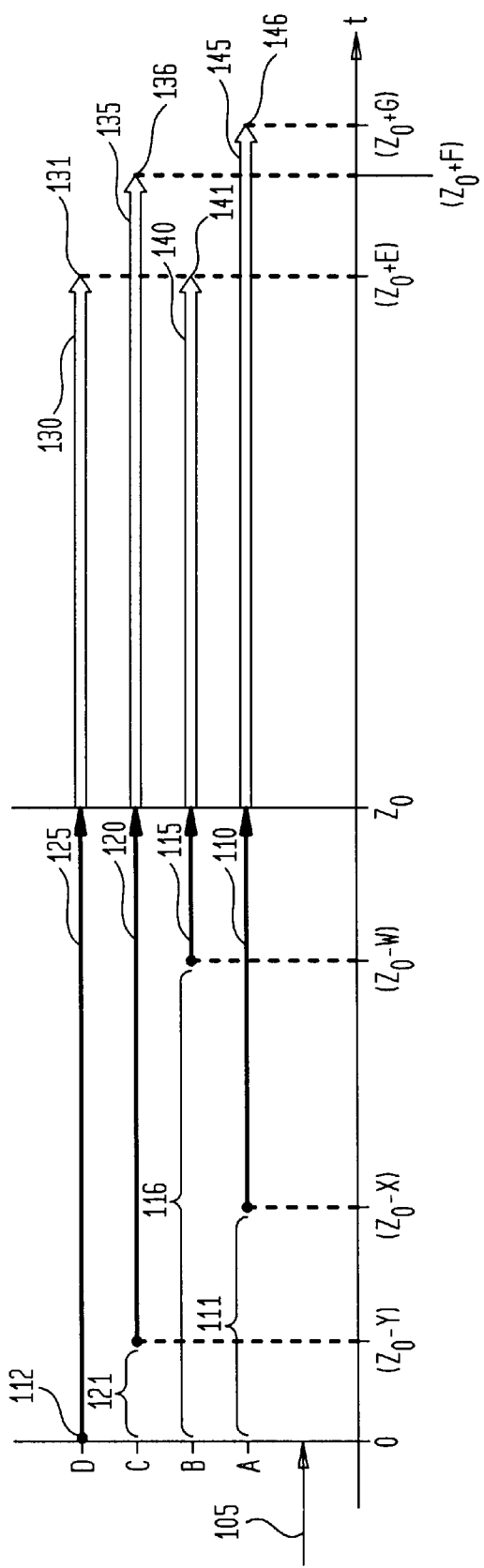
FIG. 2 is a graphical diagram illustrating a concurrent alerting timing scheme for multiple outgoing communication sessions in accordance with the present invention.

FIG. 2 is a graphical diagram illustrating a concurrent alerting timing scheme for multiple outgoing communication sessions in accordance with the present invention, with varying no answer time parameters for purposes of example, and follows directly from FIG. 1B. Referring to FIG. 2, utilizing their respective timing delay parameters discussed above, the various outgoing call legs A, B, C and D are concurrently alerted at time $t=Z_0$. If unanswered, each of these outgoing call legs A, B, C and D will continue to be alerted for a predetermined period of time known or referred to as a "no answer time" ("NAT"). As exemplary illustrations in FIG. 2, outgoing call legs B and D have, respectively, no answer times 130 and 140, each having a duration equal to time period E, with alerting commencing at time $t=Z_0$ and terminating if unanswered a time $t=(Z_0+E)$; outgoing call leg C has a no answer time 135 having a duration equal to time period F, with alerting commencing at time $t=Z_0$ and terminating if unanswered a time $t=(Z_0+F)$, with F>E illustrated in FIG. 1B; and outgoing call leg A has a no answer time 140 having a duration equal to time period G, with alerting commencing at time $t=Z_0$ and terminating if unanswered a time $t=(Z_0+G)$, with G>F>E as illustrated in FIG. 2. For concurrent alerting, these various no answer time periods may be selected or determined in a variety of ways, such as varied (as illustrated), equal, or as otherwise desired or as specified by a subscriber. For example in FIG. 2, all outgoing call legs could have equal no answer times, such as all equal to time period F.

Continuing to refer to FIG. 2, upon the expiration of these various no answer time periods, the outgoing call legs A, B, C and D may be treated or handled in various ways, depending upon their respective no answer termination triggers 131, 136, 141 and 146. As discussed in greater detail below, for example, such termination triggers may specify, and preferably specify, following expiration of a no answer time period, that the respective call is released, as illustrated in FIG. 2 (and also preferably implemented for the other alerting patterns of FIGS. 3–5). Under other circumstances, such termination triggers may provide for other call handling instructions, such as rerouting of an outgoing call leg to another secondary DN (not separately illustrated in FIG. 2).

Figure 3A:
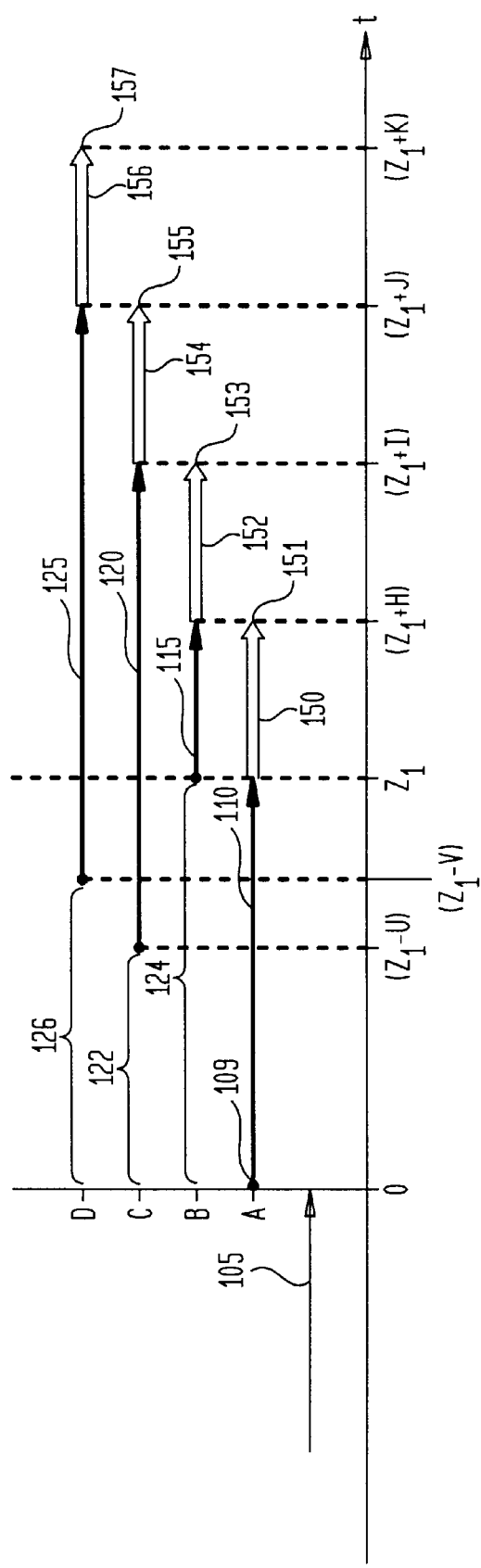
FIG. 3A is a graphical diagram illustrating a sequential alerting timing scheme for multiple outgoing communication sessions in accordance with the present invention.

FIG. 3A is a graphical diagram illustrating a sequential alerting timing scheme for multiple outgoing communication sessions in accordance with the present invention. As illustrated in FIG. 3A, each outgoing call leg has its same processing and routing time as previously illustrated, and outgoing call leg A is to be alerted first, at time $t=Z_1$, followed by outgoing call leg B at time $t=(Z_1+H)$, which is then followed by outgoing call leg C at time $t=(Z_1+I)$, and lastly followed by outgoing call leg D at time $t=(Z_1+J)$. For this timing pattern of sequential alerting, given the respective processing times for the outgoing call legs, each outgoing call leg may have a different timing delay parameter than previously utilized (in reference to FIGS. 1B and 2A). More specifically, outgoing call leg A has a timing delay parameter 109 equal to zero (RSAT=0); outgoing call leg C has a timing delay parameter 122 equal to $(Z_1-U)$ (RSAT= $(Z_1-U)$), with $(Z_1-U)>0$; outgoing call leg D has a timing delay parameter 126 equal to $(Z_1-V)$ (RSAT=$(Z_1-V)$), with $(Z_1-V)>(Z_1-U)$; and outgoing call leg B has a timing delay parameter 124 equal to $Z_1$ (RSAT=$Z_1$), with $Z_1>(Z_1-V)$.

Continuing to refer to FIG. 3A, each outgoing call leg A, B, C and D has a respective no answer time (NAT) parameter 150, 152, 154, and 156 which, as illustrated in this case, are equal to each other and have a duration equal to H. As illustrated, alerting of outgoing call leg A commences at time $t=Z_1$, and if unanswered, with its $NAT_A=H$, alerting continues until time $t=(Z_1+H)$, at which time alerting is ceased and outgoing call leg A is released, utilizing termination trigger 151. At the same time $t=(Z_1+H)$, alerting of outgoing call leg B commences, and if unanswered, with its $NAT_B=H$, alerting continues until time $t=(Z_1+I)$ (where I=2H), at which time alerting is ceased and outgoing call leg B is released, utilizing termination trigger 153. Alerting of outgoing call leg C then commences at time $t=(Z_1+I)$, and if unanswered, with its $NAT_C=H$, alerting continues until time $t=(Z_1+J)$ (where J=3H), at which time alerting is ceased and outgoing call leg C is released, utilizing termination trigger 155. Alerting of outgoing call leg D then commences at time $t=(Z_1+J)$, and if unanswered, with its $NAT_D=H$, alerting continues until time $t=(Z_1+K)$ (where K=4H), at which time alerting is ceased and outgoing call leg D is released, utilizing termination trigger 157.

As may be apparent from FIG. 3A, as alerting is ceased for one outgoing call leg, alerting begins for a different outgoing call leg. Not separately illustrated in FIG. 3A, the respective NAT parameters of the outgoing call legs may be varied and different from each other, to produce different sequential alerting patterns having varying time periods of alerting of the outgoing call legs. In addition, with knowledge (or estimates) of the processing time periods (approximately) for each outgoing call leg, and given the desired relative time for commencement of alerting of the given outgoing call leg depending upon the selected alerting pattern (such as alerting commencing sequentially at $Z_1$, $(Z_1+H)$, $(Z_1+I)$, and $(Z_1+J)$ for the sequential alerting illustrated in FIG. 3A), corresponding RSAT values may be determined arithmetically for each outgoing call leg.

Figure 3B:
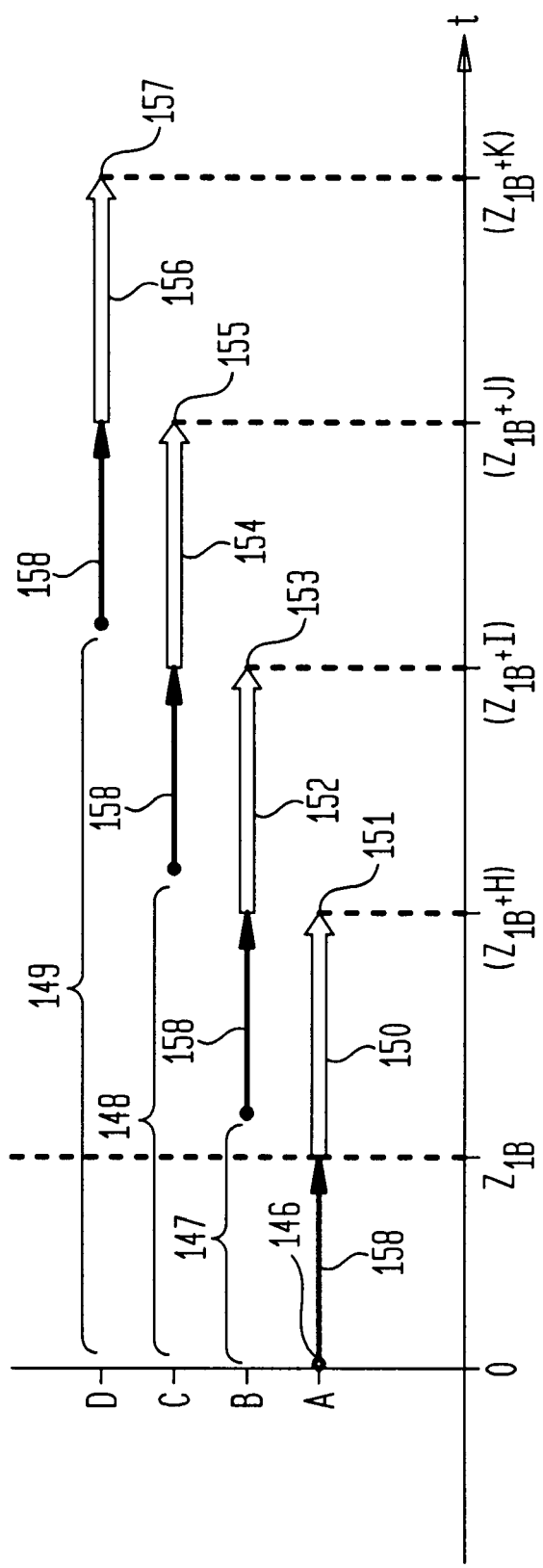
FIG. 3B is a graphical diagram illustrating a second sequential alerting timing scheme for multiple outgoing communication sessions in accordance with the present invention, in which all outgoing call legs have approximately equal processing and routing time periods.

With reference to FIG. 3A discussed above, and with reference to FIGS. 4–5 discussed below, it should be noted that in any given situation, processing times for outgoing call legs may be sufficiently short that, for any given outgoing call leg and selected alerting pattern, its processing and routing may not begin until after alerting has commenced for other call legs. Such a situation is illustrated in FIG. 3B for sequential alerting, in which processing times for all outgoing call legs are small and approximately equal. As illustrated in FIG. 3B, given such equal processing and routing time periods 158 for all call legs (or given negligible processing and routing time periods), for sequential alerting, the RSAT values for each successive outgoing call leg are equal to various combinations of the RSAT and NAT values of the previously routed call legs, namely, $RSAT_{(n+1)}=RSAT_{(n)}+NAT_{(n)}$. As illustrated in FIG. 3B, with a special case of $RSAT_A$ 146 equal to zero, and with equal no answer time periods for all outgoing call legs, each successive RSAT value is equal to an integer multiple of the NAT value: $RSAT_B$ (147)=$NAT_A$; $RSAT_C$ (148)=$RSAT_B+NAT_B$ =$2(NAT_A)$; and $RSAT_D$ (149)=$RSAT_C+NAT_C$=$3(NAT_A)$. While such an analysis is not separately illustrated for FIGS. 4 and 5, such an equivalent analysis with various combinations of RSAT and NAT values will be readily apparent to those skilled in the art, such as, for example, $RSAT_{(n+1)}=RSAT_{(n)}+NAT_{(n)}/2$ for the cascade alerting of FIG. 4, and $NAT_{(n)}=RSAT_{(n+1)}+NAT_{(n+1)}$ for the pyramid alerting scheme of FIG. 5.

FIG. 4 is a graphical diagram illustrating a cascade alerting timing scheme for multiple outgoing communication sessions in accordance with the present invention. For such a cascade alerting scheme, while certain call legs are in the process of being alerted, other, additional call legs commence alerting, such that there is an "overlap" in the alerting of the various outgoing call legs. Again, depending upon the selected pattern of cascade alerting, RSAT and NAT values may be varied from those illustrated as examples in FIG. 4. Also for purposes of example, as illustrated in FIG. 4, each outgoing call leg has its same processing and routing time as previously illustrated.

Also instead of concurrent alerting, for the cascade alerting pattern illustrated in FIG. 4, the alerting of the various outgoing call legs overlap, with outgoing call leg A is to be alerted first, at time $t=Z_2$, and if A is unanswered, followed by outgoing call leg B at time $t=(Z_2+L)$, which if A and B are unanswered, is then followed by outgoing call leg C at time $t=(Z_2+M)$, and when A, B and C are unanswered, lastly followed by outgoing call leg D at time $t=(Z_2+N)$. For this pattern of cascade alerting, given the respective processing times for the outgoing call legs, each outgoing call leg may have a different timing delay parameter than previously utilized or discussed. In addition, while as illustrated each outgoing call leg has an equal NAT parameter, depending upon the selected pattern of cascade alerting, the NAT values for each outgoing call leg may also be varied.

More specifically, as illustrated in FIG. 4, outgoing call leg A has a timing delay parameter 174 equal to zero (RSAT=0); outgoing call leg C has a timing delay parameter 176 equal to $(Z_2-CC)$ (RSAT=$(Z_2-CC)$), with $(Z_2-CC)>0$); outgoing call leg D has a timing delay parameter 177 equal to $(Z_2-BB)$ (RSAT=$(Z_2-BB)$, with $(Z_2-BB)>(Z_2-CC)$); and outgoing call leg B has a timing delay parameter 175 equal to $(Z_2-AA)$ (RSAT=$Z_2-AA$), with $(Z_2-AA)>(Z_2-BB)$).

For this exemplary cascade alerting, only outgoing call leg A is alerted beginning at time $t=Z_2$, with a timing delay 174 equal to zero ($RSAT_A=0$), with a no answer time 162 equal to M ($NAT_A=M$), and alerting of A ceased if outgoing call legs A and B remain unanswered at time $t=(Z_2+M)$ (with M=2L as an example), at which time outgoing call leg A is released, utilizing termination trigger 163. If outgoing call leg A has not been answered previously, outgoing call leg B is alerted beginning at time $t=(Z_2+L)$, following a timing delay 175 equal to $(Z_2-AA)$ ($RSAT_B=(Z_2-AA)$), where L=M/2, with a no answer time 164 also equal to M ($NAT_B=M$), and alerting of B ceased if call legs A (prior to $t=(Z_2+M)$), B, and C remain unanswered at time $t=(Z_2+N)$ (with N=3L=3M/2, for this example), at which time outgoing call leg B is released, utilizing termination trigger 165. If outgoing call legs A and B have not been answered previously, outgoing call leg C is alerted beginning at time $t=(Z_2+M)$, following a timing delay 176 equal to $(Z_2-CC)$ ($RSAT_C=(Z_2-CC)$), where N=3M/2, with a no answer time 166 also equal to M ($NAT_C=M$), and alerting of C ceased if call legs B (prior to $t=(Z_2+M)$), C and D remain unanswered at time $t=(Z_2+O)$ (with O=4L=2M, for this example), at which time outgoing call leg C is released, utilizing termination trigger 167. Lastly, if outgoing call legs A, B and C have not been answered previously, outgoing call leg D is alerted beginning at time $t=(Z_2+N)$, following a timing delay 177 equal to $(Z_2-BB)$ ($RSAT_B=Z_2-BB$), where N=3L=3M/2, with a no answer time 168 also equal to M ($NAT_D=M$), and alerting of D ceased if call legs C (prior to $t=(Z_2+O)$) and D remain unanswered at time $t=(Z_2+P)$ (with P=5L=5M/2, for this example), at which time outgoing call leg D is released, utilizing termination trigger 169.

FIG. 5 is a graphical diagram illustrating an exemplary pyramid alerting timing scheme for multiple outgoing communication sessions in accordance with the present invention. As will be apparent from the discussion below, pyramid alerting differs from cascade and sequential alerting by varying both NAT and RSAT values, allowing the next outgoing call alerting to begin during the alerting of the previous outgoing call leg, with alerting of all outgoing call legs continuing to be maintained (if unanswered) until a predetermined period of time has elapsed.

As illustrated in FIG. 5B, each outgoing call leg has its same processing and routing time as previously illustrated. Again, instead of concurrent alerting, for this pyramid alerting pattern, only outgoing call leg A is alerted beginning at time $t=Z_3$, and if unanswered, followed by alerting of outgoing call leg B at time $t=(Z_3+Q)$, and if A and B are unanswered, followed by alerting of outgoing call leg C at time $t=(Z_3+R)$, and lastly, if A, B and C are unanswered, followed by alerting of outgoing call leg D at time $t=(Z_3+S)$. For this pattern of pyramid alerting, given the respective processing times for the outgoing call legs, each outgoing call leg may have a different timing delay parameter than previously utilized or discussed. More specifically, outgoing call leg A has a timing delay parameter 184 equal to zero (RSAT=0); outgoing call leg C has a timing delay parameter 186 equal to $(Z_3-FF)$ ($RSAT=(Z_3-FF)$), with $(Z_3-FF)>0$; outgoing call leg D has a timing delay parameter 187 equal to $(Z_3-EE)$ ($RSAT=(Z_3-EE)$), with $(Z_3-EE)>(Z_3-FF)$; and outgoing call leg B has a timing delay parameter 185 equal to $(Z_3-DD)$ ($RSAT=Z_3-DD$), with $(Z_3-DD)>(Z_3-EE)$.

For the pyramid alerting scheme illustrated in FIG. 5, for alerting of the outgoing call legs to be cumulative, each outgoing call leg has an individual no answer time parameter which is different than the NAT parameters of the other outgoing call legs, and different from the NAT parameters utilized or discussed previously. More specifically, outgoing call leg A has a NAT parameter 190 equal to time period T ($NAT_A=T$), such that when alerting commences at time $t=Z_3$, if all of the outgoing call legs remain unanswered, alerting of outgoing call leg A will continue until time $t=(Z_3+T)$. If outgoing call leg A has not yet been answered by time $t=(Z_3+Q)$, alerting of outgoing call leg B commences, with a NAT parameter 192 equal to time period (T-Q) ($NAT_B=(T-Q)$, with Q>0), such that when alerting of B commences at time $t=(Z_3+Q)$, if all of the outgoing call legs remain unanswered, alerting of outgoing call leg B will continue until time $t=(Z_3+T)$. Similarly, if outgoing call legs A and B have not yet been answered by time $t=(Z_3+R)$, alerting of outgoing call leg C commences, with a NAT parameter 194 equal to time period (T-R) ($NAT_C=(T-R)$, with (T-R)<(T-Q)), such that when alerting of C commences at time $t=(Z_3+R)$, if all of the outgoing call legs remain unanswered, alerting of outgoing call leg C will continue until time $t=(Z_3+T)$. Lastly, if outgoing call legs A, B and C have not yet been answered by time $t=(Z_3+S)$, alerting of outgoing call leg D commences, with a NAT parameter 196 equal to time period (T-S) ($NAT_C=(T-S)$, with (T-S)<(T-R)), such that when alerting of D commences at time $t=(Z_3+S)$, if all of the outgoing call legs remain unanswered, alerting of outgoing call leg D will continue until time $t=(Z_3+T)$. In the event that the call legs remain unanswered, utilizing termination triggers 191, 193, 195 and 197, upon expiration of the corresponding NATs, respective outgoing call legs A, B, C and D will be released.

Figure 6:
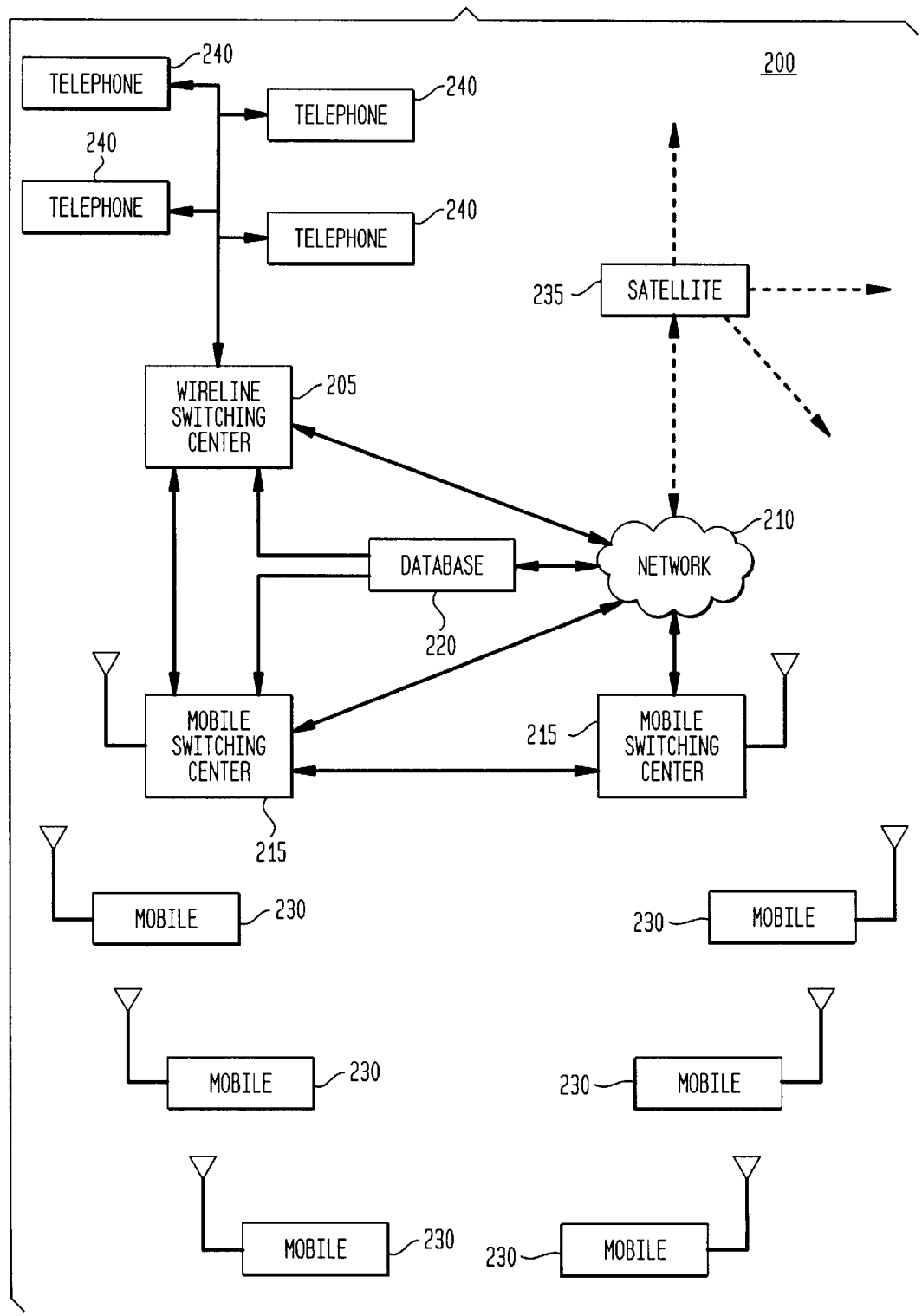
FIG. 6 is a block diagram illustrating a first system embodiment in accordance with the present invention.

FIG. 6 is a block diagram illustrating a first system embodiment 200 in accordance with the present invention. The system 200 includes one or more mobile switching centers ("MSCs") 215 and one or more wireline switching centers 205, which may also be connected via trunk and signaling lines to each other and to a broader network 210, such as a PSTN or ISDN network providing multiple telecommunication connections to other locations, such as providing a link to satellite 235. The system 200 also includes a database 220, which is preferably connected or coupled to a wireline switching center 205 and to a MSC 215. A database 220 may also be directly included or integrated within the various switching centers 205 and 215. The wireline switching center 205 is also generally connected to a plurality of telephones 240 or other customer premise equipment, while the MSCs 215 (via base stations or other wireless transceivers, not separately illustrated) typically have a wireless link to the various mobile units 230, such as cellular telephones within a particular geographic region. In addition, while the wireline and mobile switching centers 205 and 215 are usually physically separated due to regulatory and other historical reasons, these switching centers may also be combined into one or more switching centers having both wireline and wireless functionalities.

Continuing to refer to FIG. 6, an incoming call directed to a primary DN may be received by either the wireline switching center 205 or one of the mobile switching centers 215. The switching center 205 or 215 then transmits a request to database 220 for an alerting list containing the secondary directory numbers associated with the primary or pilot DN (such as a termination list). In accordance with the present invention, the database 220 transmits a response to the corresponding switching center 205 or 215, containing or listing the associated DNs and each of their corresponding parameters (one set of parameters for each associated DN), including each of their timing delay parameters (RSAT values), no answer time parameters (NAT values), and no answer termination trigger parameters. Utilizing these corresponding parameters, the switching center 205 or 215 begins the processing and routing of the associated outgoing call legs, with such processing and routing of each outgoing call leg delayed according to its corresponding timing delay parameter, and unless one of the call legs is answered, with each such outgoing call leg allowed to be alerted according to its no answer time parameter, followed by release according to its no answer termination trigger parameter, as illustrated above with respect to FIGS. 2–5.

For example, for pyramid alerting, for an incoming call to a pilot DN at a MSC 215, an outgoing leg for a mobile 230 outside its serving area (served by another MSC 215) may be routed immediately with no delay (e.g., an RSAT=0), with a NAT of 15 seconds and a release or drop for a no answer termination trigger; if unanswered, then followed by routing a second outgoing leg having multiple PSTN connections with a three second delay (e.g., an RSAT=3.0), with a NAT of 12 seconds and a release or drop for a no answer termination trigger; if both previous call legs are unanswered, then followed by routing a third, wireline call with a six second delay (e.g., an RSAT=6.0), with a NAT of 9 seconds and a release or drop for a no answer termination trigger; and if all three previous call legs are unanswered, then followed by routing a fourth, mobile call within its serving area with a nine second delay (e.g., an RSAT 9.0), with a NAT of 6 seconds and a release or drop for a no answer termination trigger. Depending upon the accuracy of the parameters utilized, the multiple outgoing call legs will have a pyramid alerting scheme or pattern, with alerting times staggered by three seconds each, and if unanswered, alerting ceasing and the outgoing call legs released approximately six seconds following the commencement of alerting of the last outgoing call leg. Other values of the various parameters may also be utilized, to provide other types or patterns of alerting. Additional details of operation of the system 200 are discussed in greater detail below.

Figure 7:
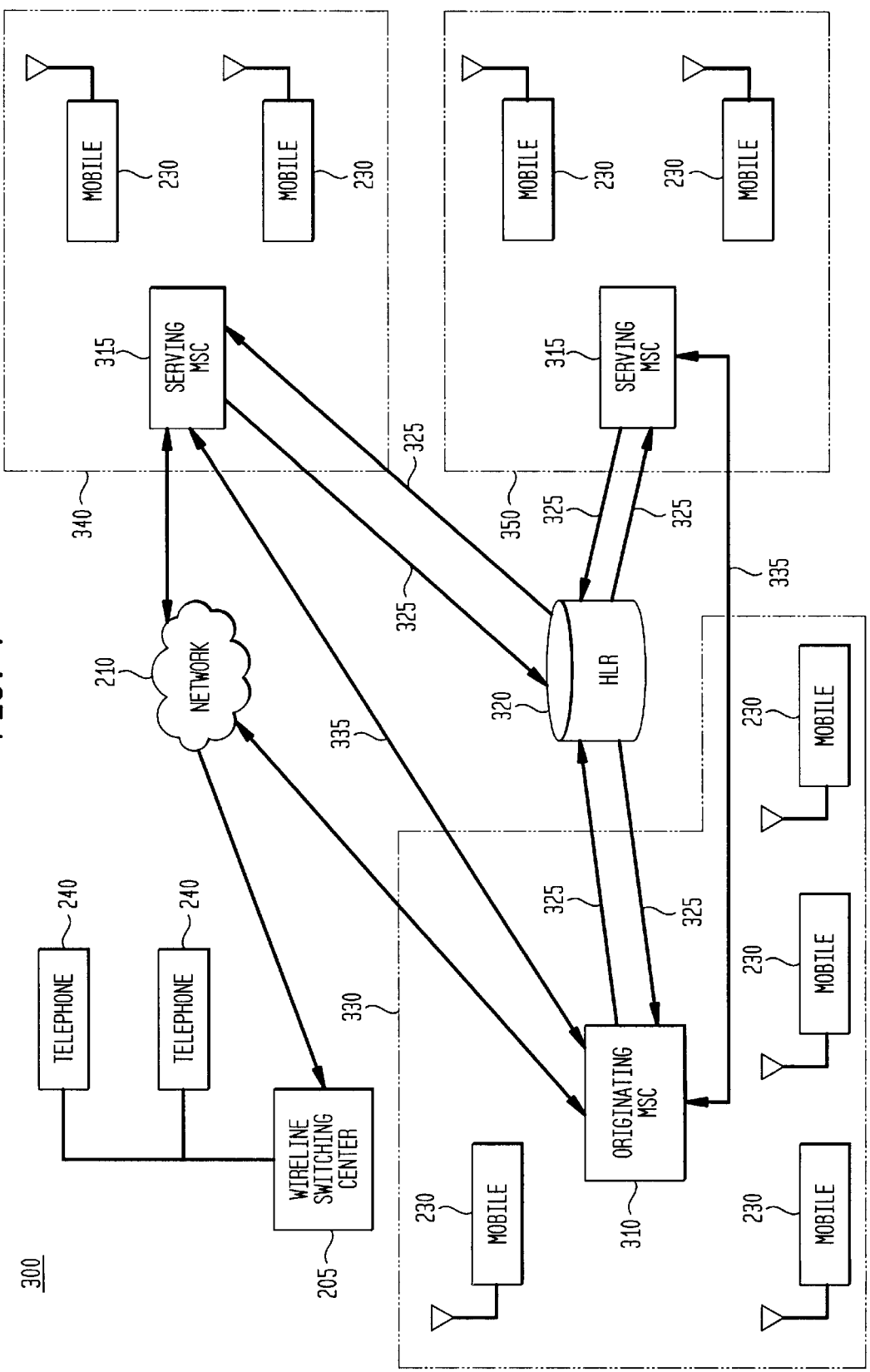
FIG. 7 is a block diagram illustrating a second system embodiment for wireless communication in accordance with the present invention.

FIG. 7 is a block diagram illustrating a second, preferred system embodiment 300 for wireless communication in accordance with the present invention, such as for ANSI-41 flexible alerting. In this system 300, the mobile switching centers 215 are represented by two types of MSCs. The first type of MSC, referred to as an incoming call or originating MSC 310, directly provides service to the mobile units 230 within its designated or predetermined geographic region 330. The second type of MSC, referred to as a serving MSCs 315, provides service to mobile units 230 which have traveled or roamed into their designated or predetermined geographic regions 340 and 350. A stand-alone home location register ("HLR") 320 is utilized in this preferred embodiment, among other things, to implement the database 220 and other ANSI-41 signaling functionality. The various MSCs 310 and 315 are preferably connected to the HLR 320 via ANSI-41 signaling interfaces and corresponding links 325. As in the system of FIG. 6, the various MSCs 310 and 315 are also connected or coupled to a wireline switching center 205 and to a network 210, for multiple network connections, such as PSTN, ISDN, or satellite connections.

As indicated above, a user or subscriber typically defines their alerting group of secondary telephone numbers (or other directory numbers). These secondary DNs are those numbers that the subscriber would like alerted when their pilot or other primary DN is called. Such secondary DNs included in a user defined alerting group or termination list may also be divided into different groupings or sets based upon their potentially differing routing requirements. For example, the wireless and wireline groupings may be utilized, along with subsets of these groupings, such as wireless DNs served by MSCs other than the originating MSC 310. In accordance with the invention disclosed in the first related application, four types of exemplary routing groups or situations are utilized, with their corresponding timing delay parameters for providing concurrent alerting: group 1, wireline DNs, which may be located locally, regionally, nationally or internationally; group 2, wireless DNs in a location served by the originating MSC 310; group 3, wireless DNs in a location served by a serving MSC 315; and group 4, wireless DNs served from a location in which its data or other information is located on a different HLR, i.e., on an HLR other than HLR 320.

Continuing to refer to FIG. 7, when an originating MSC 310 receives an incoming call to or otherwise designating a pilot DN or other primary directory number, the originating MSC 310 transmits a query or other message to an HLR 320. Such a query is typically in the form of a data packet, and includes a reference to the pilot DN or other primary DN. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call, from one of the mobile units 230, or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320, and is initiated with a "TCAP INVOKE (LAST), carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its database, the HLR 320 first determines whether the pilot or primary DN is for a flexible alerting group or other multi-leg communications group, and if so, prepares a response or other message containing the secondary DNs (of the user's or subscriber's defined alerting group), and further containing their corresponding parameters, such as RSAT values, NAT values, and termination triggers, in accordance with the present invention. The HLR 320 then transmits, back to the originating MSC 310, a response data packet having a listing of secondary DNs with each of their corresponding parameters (RSAT values, NAT values, and termination triggers). In the preferred embodiment, RSAT and NAT values are designated in one second increments, utilizing an 8 bit parameter, from zero to 255 seconds.

To provide a selected alerting pattern for all of these secondary DNs in accordance with the present invention, such as concurrent, pyramid, sequential and cascade alerting, the originating MSC 310, utilizing the information contained in the response data packet (the listing of secondary DNs and each of their corresponding parameters), begins the processing and routing of each outgoing call leg to each secondary DN, with: (1) such processing and routing delayed (if at all) according to each secondary DN's respective timing delay parameter; (2) alerted for the duration of its no answer time parameter, unless an outgoing call leg has been previously answered; and (3) released or otherwise treated according to its no answer termination trigger, also unless another outgoing call leg has been previously answered. If and when one of these outgoing call legs is answered, the originating MSC 310 connects the calling party (incoming leg) to that answered outgoing leg, followed by releasing the remaining outgoing legs and ceasing their alerting.

As indicated above, the processing and routing of these outgoing call legs, in the preferred embodiment, may be divided into four groups: (1) wireline secondary DNs; (2) wireless secondary DNs in a geographical location 330 served by the originating MSC 310; (3) wireless secondary DNs in a geographical location (340 or 350) served by a serving MSC 315; and (4) wireless secondary DNs served from a location in which its data or other information is located on a different HLR, i.e., on an HLR other than HLR 320, such as an HLR of a different service provider. In addition, timing delay parameters may also be determined, at least initially, based upon these four groupings of the outgoing call legs, as discussed in greater detail below.

The processing and routing of the first two groups of secondary DNs are relatively straightforward. For wireline secondary DNs, the originating MSC 310 waits a predetermined period of time (if any) corresponding to each wireline secondary DN's timing delay parameter, and then routes each such call through the network 210, such as a PSTN or ISDN network. Similarly, for wireless secondary DNs in a geographical location 330 served by the originating MSC 310, the originating MSC 310 waits a predetermined period of time (if any) corresponding to each wireless secondary DN's timing delay parameter, and then routes each such call to the mobile units 230 within its geographic region 330 which correspond to each such wireless secondary DN.

For the third group in which wireless secondary DNs are in a geographical location served by a serving MSC 315, such as regions 340 or 350 illustrated in FIG. 7, additional processing is typically required. As mobile units 230 power on, a signal is typically transmitted between the mobile unit 230 and the MSC serving the geographic region in which the mobile unit is located, which may be an originating MSC 310 or a serving MSC 315, which signal indicates that the mobile unit 230 is within that service region. In addition, when an originating MSC 310 receives a call for one of its mobile units 230, it typically transmits a request (or page) to that mobile unit 230 to verify its location prior to allocating its resources (such as a wireless channel) and connecting the wireless call. As these various mobile units 230 travel and roam out of the geographic region 330 served by its originating (or "home") MSC 330, and move into regions 340 or 350 served by other MSCs referred to as the serving MSCs 315, the mobile units 230 and the serving MSCs 315 also exchange such location information. For any given call, the serving MSC 315 assigns each such roaming mobile unit 230 a temporary local directory number ("TLDN") for use within its serving geographic region 340 or 350. The serving MSC 315 also transmits this location information to the HLR 320. The HLR 320 maintains and logs this information as each such mobile unit 230 may roam in and out of the various geographic regions, such as regions 330, 340 and 350, and stores such information by typically updating a memory pointer designating the particular serving MSC 315 corresponding to the secondary DN of the roaming mobile unit 230.

As a consequence, when the HLR 320 receives a query from an originating MSC 310 concerning an alerting group corresponding to a primary DN, such as an ANSI-41 LocationRequest, the HLR 320 may have information indicating that a particular mobile unit 230 of the alerting group is or was last known to be in a region 340 or 350 of a serving MSC 315. The HLR 320 then transmits a routing request to the serving MSC 315 for the particular mobile unit 230 (having the corresponding secondary DN of the alerting group), such as an ANSI-41 RoutingRequest INVOKE, requesting a TLDN to correspond to the particular roaming mobile unit 230. The serving MSC 315 assigns such a TLDN to the particular roaming mobile unit 230, and transmits this TLDN information to the HLR 320, such as in an ANSI-41 RoutingRequest RETURN RESULT data packet. This TLDN information (instead or in lieu of a secondary DN) is then included in the location response data package transmitted by the HLR 320 to the originating MSC 310, as mentioned above, with a corresponding parameters (RSAT, NAT and termination triggers). As the originating MSC 310 processes and routes the outgoing call legs to the secondary DNs of the alerting group with their corresponding timing delays, the originating MSC waits the predetermined period of time designated by the corresponding timing delay parameter (if any), and then processes and routes the outgoing call leg to the particular roaming mobile unit 230 utilizing its TLDN. Such a call may be routed from the originating MSC 310 to the serving MSC 315 through either a direct signaling and trunk connection 335, if it exists, or may be routed through the network 210, such as the PSTN.

Outgoing call legs for the fourth type of secondary DN of an alerting group, which are wireless secondary DNs served from a location in which its data or other information is located on a different HLR (i.e., on an HLR other than HLR 320, such as an HLR of a different service provider), in the preferred embodiment, are processed and routed similarly to secondary DNs of the first group. More specifically, when an alerting group includes a wireless secondary DN corresponding to a mobile unit 230 served by an HLR other than HLR 320, the HLR 320 has no further information regarding that particular mobile unit 230, as ANSI-41 does not support direct signaling or other information connections between different HLRs. The particular mobile unit 230 (served by a different HLR) is essentially unknown the HLR 320; the HLR 320 simply has a secondary DN for this mobile unit 230 within its database corresponding to the primary DN. As a consequence, this secondary DN is treated similarly to a wireline DN (the first group), such that an outgoing call leg for such a wireless secondary DN (served by a different HLR) is routed by the originating MSC 310, after waiting a predetermined period of time (if any) corresponding to its timing delay parameter, through the network 210, similarly to any PSTN or other network call, such that the network 210 presumably then routes that call to the originating MSC and corresponding HLR which serves that secondary DN. This type of routing may have a comparatively long processing time before the mobile unit 230 is alerted, as such processing may include a corresponding exchange of information such as paging between that mobile unit 230 and its originating MSC. As such, for an alerting pattern such as concurrent alerting, the timing delay parameter may be equal to zero for such an outgoing call leg to a wireless DN served by a different HLR, as illustrated above for outgoing call leg D in FIGS. 1B and 2.

As may be apparent from the above discussion, the various timing delay parameters associated with any given secondary DN may vary considerably, depending upon how the outgoing call leg to that secondary DN is to be routed at any given time, and depending upon other network and environmental factors. For example, an outgoing call leg to a mobile unit 230 may have a longer processing and routing time for a first call, which may require a paging transmission to the mobile unit 230, than for a second call, which may not require such a paging transmission. As a consequence, for a concurrent alerting pattern, outgoing call leg placement for the first call may have a smaller timing delay parameter, while outgoing call leg placement for the second call may have a greater timing delay parameter, such that the ultimate alerting for both types of calls would be approximately concurrent. At any given time, moreover, the various mobile units 230 within an alerting group may be travelling in and out of different serving areas, also resulting in variable processing and routing times. Processing and routing times for network calls, such as wireline secondary DNs (group 1) and wireless secondary DNs served by another HLR (group 4) may also have a significant variance at any given time, depending upon network conditions such as possible or actual congestion of a network 210.

Because of such a potential for variance of these timing delay parameters, values for these parameters may be established in a variety of ways, and may be changed or normalized on a dynamic basis depending upon actual service conditions to provide the selected alerting pattern, such as concurrent alerting, sequential alerting, cascade alerting, or pyramid alerting. For example, the various timing delay parameters for each definable type or grouping of secondary DN, such as for groups one through four outlined above, may be initially determined or established empirically by a particular service provider. Such an empirical determination, also for example for concurrent alerting, may result in: a timing delay parameter of zero for group four outgoing call legs (for wireless DNs served by another HLR); a timing delay parameter of four seconds for group three outgoing call legs (wireless DNs served by a serving MSC 315); a timing delay parameter of seven seconds for group two outgoing call legs (wireless DNs served by an originating MSC 310); and a timing delay parameter of twelve seconds for group one outgoing call legs (wireline DNs served by a network 210). For any given secondary DN, its timing delay parameter may vary depending upon its location, such as whether its mobile unit 230 has roamed out of the geographic area served by an originating MSC 310 and into a geographic area served by a serving MSC 315. In addition, such timing delay parameters may also be varied based upon any chosen or desired type or pattern of alerting, such as pyramid, sequential or cascade alerting, in addition to concurrent alerting.

The various timing delay parameters may also be varied based upon actual usage and subscriber feedback. For example, for a concurrent alerting pattern, a particular subscriber may find that within his or her alerting group, the cellular telephone rings 2 seconds later than the home office telephone. For more accurate concurrent alerting, the timing delay parameter for the cellular telephone may be decreased by two seconds, or the timing delay parameter for the home office telephone may be increased by two seconds.

The various parameters utilized with the present invention, such as RSAT, NAT and termination triggers, may also be implemented into a system 200 or 300 in a variety of ways. For example, initial values may be programmed into an HLR 320 or other database 220 by a service provider during the initial programming establishing the subscriber's alerting group. These values may also be varied over time by, for example, dynamic calculations by a processor (FIG. 8) within the HLR 320 prior to responding to the originating MSC 310 with the listing of secondary DNs and corresponding timing delay parameters. In addition, a user interface may be provided for a subscriber to personally vary these values, for example, through an interactive voice or keypad menu. Once established and properly functioning to provide appropriate control over the start of alerting, such as concurrent, pyramid, sequential or cascade alerting (or as close an approximation thereto as may be reasonably achieved), the various parameters, for any given secondary DN and its potential locations (such as home and different roaming areas), may remain relatively static.

In addition, the values for the various parameters may have two different forms in the preferred embodiment. The values discussed above have been relative parameters, providing an increment or period of time relative to the start of outgoing call leg routing (at time t=0). Values for the various parameters may also be expressed in an absolute form, such as 10:43:02 a.m., 10:43:04 a.m., and so on, thereby also providing synchronizing information for the various outgoing call legs.

As mentioned above, in the preferred embodiment, a location query from an originating MSC 310 to an HLR 320 is a data packet in accordance with the ANSI-41 specifications for a LocationRequest. Conversely, however, there is no provision within the ANSI-41 specification for an HLR 320 to transmit a timing delay parameter, in accordance with the present invention, to an MSC 310. There is also no provision within ANSI-41 for an HLR 320 to transmit a no answer time parameter, on a per secondary DN basis, to an MSC 310. In addition, in the preferred embodiment of system 300 as mentioned above, these parameters are transmitted as 8 bit values, referred to as an RSAT (Ring Start Adjustment Time) or NAT (No Answer Time). As a consequence, in the preferred embodiment, the list of secondary DNs associated with a primary DN, and their corresponding RSAT and NAT values, are transmitted as a data packet from the HLR 320 to the originating MSC 310 having a modified ANSI-41 format.

More particularly, the RSAT values are defined, in accordance with the invention of the first related application, as a new parameter independent of or modifying ANSI-41 , whereby this information (secondary DNs and corresponding RSAT values), is transmitted by an HLR to an originating MSC within a "TerminationList"ANSI parameter of a "LocationRequest RETURN RESULT" ("LRRR") operation, reported with a TCAP RETURN RESULT (LAST) and carried in a TCAP RESPONSE package. Within the TerminationList parameter, there are three sub-parameters utilized in the present invention for designation of secondary DNs, namely, PSTN terminations (for groups one and four); local terminations (for group two); and intersystem terminations (for group three). In turn, within each of these sub-parameters, an RSAT value is included for each secondary DN, as a new parameter, along with other ANSI parameters (such as a digits parameter). Innumerable other formats, fields or parameters transmitting such timing information may also be utilized without departing from the spirit and scope of the present invention.

Also in accordance with the preferred embodiment of the present invention, the various NAT values (also encoded as an 8 bit value) and termination triggers corresponding to a given secondary DN are also transmitted from an HLR 320 to an originating MSC 310 within a data packet having a form such as a modified LRRR discussed above. More particularly, in the preferred embodiment, and as disclosed in the second related application, the no answer time parameter is also transmitted within the TerminationList parameter or field, with an individual correspondence to a secondary DN. This individual NAT value is different from the global NAT value transmitted as a separate NoAnswerTime parameter of ANSI-41 , which provides a single NAT value for all outgoing call legs, and which cannot provide the variable alerting patterns of the present invention or the control over secondary treatment of the invention of the second related application. While the no answer termination triggers of the present invention may also be included within the TerminationList parameter, in contrast, in the event that all of the termination triggers are the same for all outgoing call legs, the no answer termination trigger of the present invention may be included within the Termination Triggers parameter of an ANSI-41 LRRR.

Figure 8:
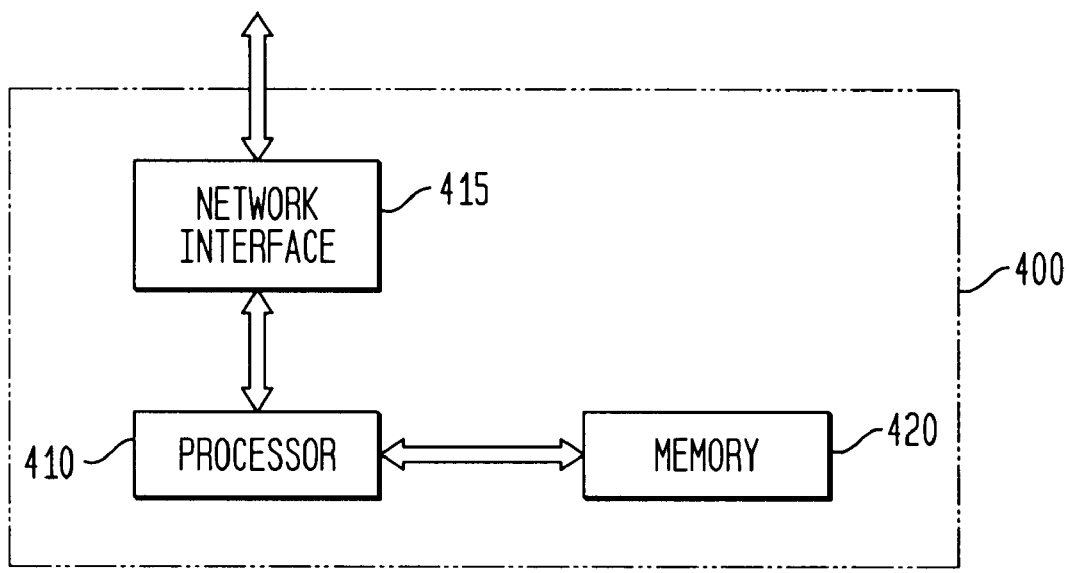
FIG. 8 is a block diagram illustrating an apparatus embodiment in accordance with the present invention.

FIG. 8 is a block diagram illustrating an apparatus embodiment 400 in accordance with the present invention. As discussed in greater detail below, such an apparatus 400 may be included within, or distributed among, an MSC (310 or 315) or HLR 320 of a system 300, or may be included within, or distributed among, a switching center 205 or 215 and database 220 of system 200. The apparatus 400 includes a processor 410, a network interface 415, and a memory 420. The network interface 415 is utilized to receive an incoming call leg to a pilot DN or primary DN, and to transmit the plurality of outgoing call legs to the secondary DNs associated with a primary DN. For example, in system 300, the network interface 415 may be couplable to the network 210 (via a trunk and signaling line) for transmission and reception of PSTN calls, and couplable to an antenna for transmission and reception of wireless calls. The memory 420 may be a magnetic hard drive, an optical storage device, or any other type of data storage apparatus. The memory 420 is used to store information pertaining to primary DNs, such as all associated secondary DNs and their timing delay parameters, and other call placement and routing information. The memory 420 performs such information storage comparable to the information storage of the database 220 or HLR 320.

Continuing to refer to FIG. 8, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIGS. 9 and 10, with associated memory, such as microprocessor memory or additional RAM, ROM, EPROM or E$^2$PROM. The methodology of the invention, as discussed above with reference to FIGS. 1–7 and as discussed below with reference to FIGS. 9 and 10, may be programmed and stored, in the processor 410 with its associated memory and other equivalent components, as a set of program instructions for subsequent execution when the processor 410 is operative (i.e., powered on and functioning).

As mentioned above, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315). In such a distributed embodiment for the system 300, the apparatus 400 would also include corresponding ANSI-41 signaling interfaces within the originating MSC 310 and the HLR 320, for communication of the various requests and responses discussed above.

In summary, the apparatus 400 for providing variable alerting patterns for multiple leg telecommunication sessions, includes, first a network interface 415 for reception of an incoming call leg designating a primary directory number and for transmission of an outgoing call leg; second, a memory 420 having a plurality of secondary directory numbers associated with the primary directory number, and for each secondary directory number of the plurality of secondary directory numbers, further having a corresponding timing delay parameter, a corresponding no answer time parameter, and a corresponding no answer termination trigger; and third, a processor 410 coupled to the memory and the network interface. The processor, when operative, includes program instructions to differentially process and route each outgoing call leg associated with each secondary directory number, of the plurality of secondary directory numbers, according to its corresponding timing delay parameter, and the processor having further instructions to, unless an outgoing call leg of the plurality of outgoing legs has been answered, alert each outgoing call leg for a time period of its corresponding no answer time parameter and, upon an expiration of the time period, treat each outgoing call leg according to its corresponding no answer termination trigger.

More specifically, the processor 410 includes program instructions to wait an initial predetermined period of time, determined by a smallest timing delay parameter of a plurality of corresponding timing delay parameters, and following the initial predetermined period of time, to route a first outgoing call leg to a first secondary directory number, of the plurality of secondary directory numbers, corresponding to the smallest timing delay parameter. The processor 410 includes further program instructions to wait a subsequent predetermined period of time, determined by a next smallest timing delay parameter of the plurality of corresponding timing delay parameters, and following the subsequent predetermined period of time, to route an outgoing call leg to another secondary directory number, of the plurality of secondary directory numbers, corresponding to the next smallest timing delay parameter, until a sooner to occur of either a routing of all outgoing call legs corresponding to the plurality of secondary directory numbers or an answering of an outgoing call leg of the plurality of outgoing call legs.

Figure 9:
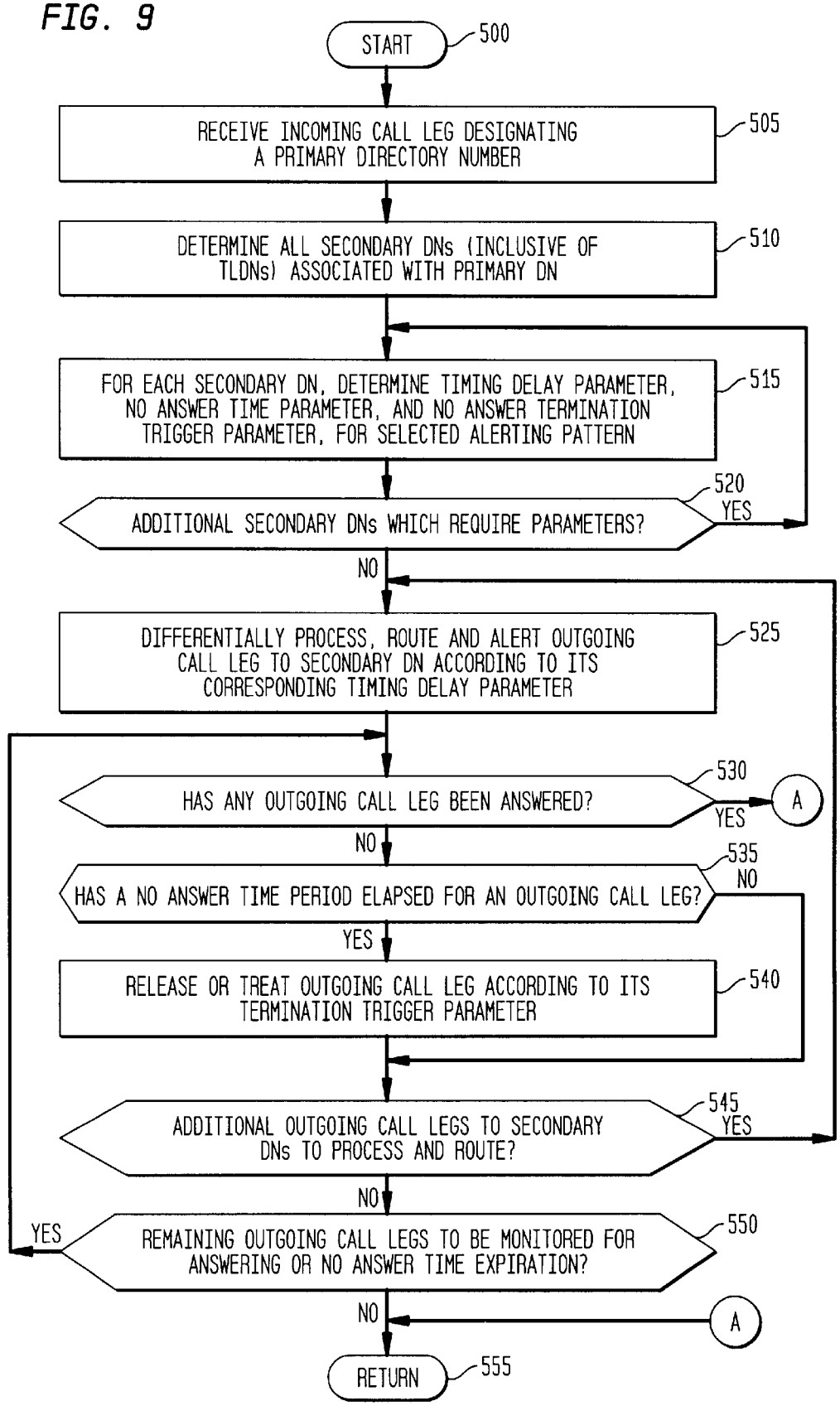
FIG. 9 is a flow diagram illustrating a method embodiment in accordance with the present invention.

FIG. 9 is a flow diagram illustrating a method embodiment in accordance with the present invention. Beginning with start step 500, the method begins with the reception of an incoming call leg designating a primary DN, step 505, such as a pilot DN of the ANSI-41 specification. Next, in step 510, the method determines all secondary DNs associated with the primary DN. As indicated above, this is usually performed in the preferred embodiment through a query to the HLR 320, such as an ANSI-41 LocationRequest. Following step 510, for each secondary DN, the method determines a corresponding timing delay parameter, a corresponding no answer time parameter, and a corresponding no answer termination trigger parameter, for a selected alerting pattern, step 515, such as RSAT, NAT and termination trigger values, for a selected pattern such as cascade, pyramid, sequential or concurrent alerting. Next, in step 520, the method determines whether there are more secondary DNs remaining which require determination of corresponding parameters, and if so, the method returns to step 515 to determine these parameters. The method continues to repeat steps 515 and 520 until all secondary DNs (associated with the primary DN) have corresponding timing delay parameters, corresponding no answer time parameters, and corresponding no answer termination triggers. When all such secondary DNs have corresponding parameters in step 520, the method proceeds to differentially process, route and alert each outgoing call leg to each secondary DN utilizing the corresponding timing delay parameter and corresponding no answer time parameter, step 525. More specifically, for each individual secondary DN, the method waits or delays routing for a predetermined period of time, if any, as designated in the corresponding timing delay parameter, and then proceeds to immediately route and alert an outgoing call leg to that secondary DN.

Continuing to refer to FIG. 9, the method then determines whether any previously routed outgoing call leg has been answered, step 530. If one of the outgoing call legs has been answered in step 530, the method may end, return step 555. When none of the previously routed outgoing call legs have been answered in step 530, the method determines whether the no answer time parameter has expired for any of the previously routed outgoing call legs, step 535. If the no answer time period has elapsed in step 535, the method then releases that outgoing call leg, step 540. When a no answer time period has not elapsed in step 535, and following step 540, the method determines whether outgoing call legs to additional secondary DNs remain to be routed and alerted, step 545. When there are remaining call legs to be routed in step 545, the method returns to step 525 to differentially process, route and alert the next outgoing call leg. When there are no remaining call legs to be routed in step 545, the method determines whether there are remaining outgoing call legs which should be monitored, step 550. When there are remaining outgoing call legs to be monitored in step 550, the method returns to step 530, to monitor answering and expiration of no answer time parameters. When an outgoing call leg has been answered in step 530, or when there are no more outgoing call legs to be monitored in step 550, the method may end, return step 555.

Figure 10B:
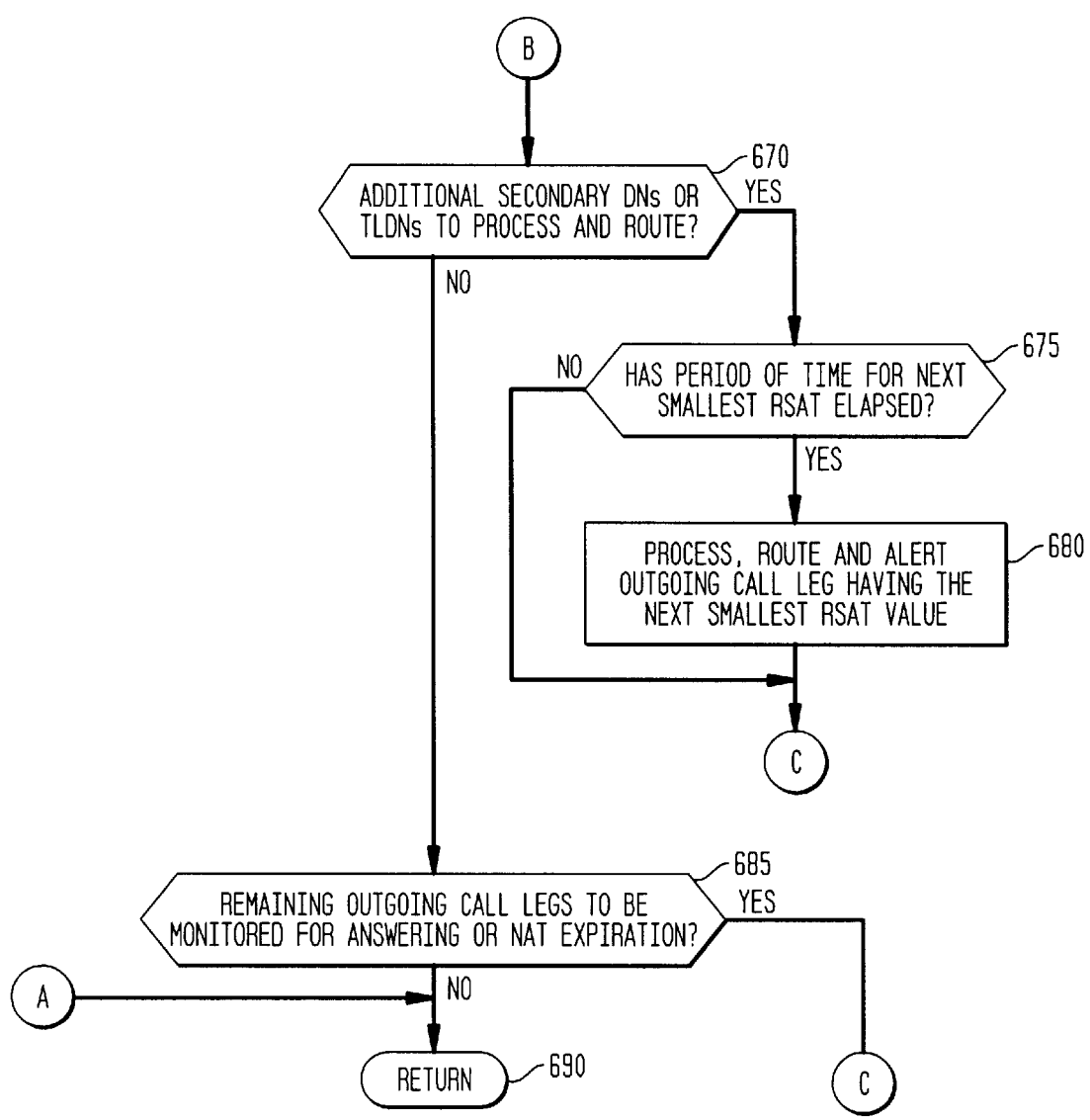
FIG. 10 is a flow diagram illustrating a preferred method embodiment for wireless communication in accordance with the present invention.

FIG. 10 is a flow diagram illustrating a preferred method embodiment for wireless communication in accordance with the present invention. Beginning with start step 600, the method receives an incoming call leg designating a pilot DN, step 605, typically by an originating MSC 310. Next, a location request specifying the pilot DN is transmitted, preferably from an originating MSC 310 to a HLR 320 using an ANSI-41 LocationRequest, step 610. The location request is received, preferably by the HLR 320, step 615, and all secondary DNs of a flexible alerting group designated by the pilot DN are determined, step 620, also preferably by the HLR 320. Next, TLDNs of any roaming mobile units (associated with secondary DNs), if any, are determined, step 625. As mentioned above, in the preferred embodiment, this is accomplished by the HLR 320 transmitting a RoutingRequest to a serving MSC 315, which in turn provides a corresponding TLDN to the HLR 320 in a RoutingRequest RETURN RESULT.

Next, in step 630, timing delay parameters, no answer time parameters and termination trigger parameters are determined (as RSAT, NAT and Termination Trigger parameter values), for each secondary DN and any associated TLDNs (if any), also preferably by the HLR 320. A LocationRequest RETURN RESULT including RSAT, NAT and termination trigger parameter values for each secondary DN (and any associated TLDNs (if any)) is transmitted, preferably by the HLR 320 to the originating MSC 310, step 635. The LocationRequest RETURN RESULT, including RSAT, NAT and termination trigger parameter values, for each secondary DN (and any associated TLDNs (if any)) is received, preferably by the originating MSC 310, step 640.

Following reception of the LRRR having RSAT, NAT and termination trigger parameter values in step 640, the method begins corresponding differential processing and routing of each outgoing call leg corresponding to each secondary DN (and any associated TLDNs, if any). More specifically, in step 645, the method waits a predetermined period of time, if any, determined by the smallest RSAT value of the LRRR, and immediately following that predetermined period of time (if any), the method routes and alerts an outgoing call leg to the secondary DN associated with this smallest RSAT value, step 650. Steps 645 and 650 are preferably performed by the originating MSC 310, and as an example, includes the routing and alerting of outgoing call leg D of FIG. 2 and outgoing call leg A of FIGS. 3A–5, having an RSAT value equal to zero (i.e., no waiting in step 645).

Continuing to refer to FIG. 10, in step 655, the method then determines whether any previously routed outgoing call leg has been answered. As discussed above, if one of the previously routed outgoing call legs has been answered in step 655, the method may end, return step 690. When none of the previously routed outgoing call legs have been answered in step 655, the method determines whether a NAT parameter has expired for any of the previously routed outgoing call legs, step 660. If the no answer time period has elapsed in step 660, the method then releases that outgoing call leg or otherwise treats that outgoing call leg according to its no answer termination trigger parameter, step 665. When a no answer time period has not elapsed in step 660, and following step 665, the method then determines whether outgoing call legs to additional secondary DNs remain to be routed and alerted, step 670. When there are remaining call legs to be routed in step 670, the method determines whether a next smallest RSAT time period has expired for routing another outgoing call leg to an additional secondary DNs or TLDNs, step 675. If an RSAT time period has not yet expired in step 675, the method returns to step 655 to continue to monitor previously routed call legs. When the next smallest RSAT time period has elapsed in step 675, the method processes, routes and alerts the outgoing call leg to the secondary DN having that next smallest RSAT value, step 680, and returns to step 655 to continue to route and/or monitor outgoing call legs. When there are no remaining call legs to be routed in step 670, the method determines whether there are remaining outgoing call legs which should be monitored, step 685. When there are remaining outgoing call legs to be monitored in step 685, the method returns to step 655, to monitor answering and expiration of no answer time parameters. When an outgoing call leg has been answered in step 655, or when there are no more outgoing call legs to be monitored in step 685, the method may end, return step 690.

Steps 640 through 685 are preferably performed by the originating MSC 310, and as an example, includes the processing, routing and alerting illustrated in FIG. 4: for example, following processing and routing of outgoing call leg A (RSAT value equal to zero) in steps 645 and 650, while monitoring the previously routed outgoing call legs for answering and expiration of corresponding NATs, the method (in steps 675 and 680) waits until time period 176 has elapsed, then routes outgoing call leg C, having an RSAT value equal to ($Z_2$–CC); followed by waiting until time period 177 has elapsed, then routing outgoing call leg D, having an RSAT value equal to ($Z_2$–BB); followed by waiting until time period 175 has elapsed, then routing outgoing call leg B, having an RSAT value equal to ($Z_2$–

AA). The method (as preferably implemented in an originating MSC 310), in steps 655, 660, 665 and 685, then continues to monitor these outgoing call legs for answering and NAT expiration, such that if any call leg remains unanswered, the MSC 310 releases call leg A at time $(Z_2+M)$, followed by releasing call leg B at time $(Z_2+N)$, followed by releasing call leg C at time $(Z_2+O)$, and followed by releasing call leg D at time $(Z_2+P)$.

As may be apparent from the above discussion, the system, apparatus and method of the present invention provide significant advantages. First, in accordance with the present invention, control over patterns of alerting of multiple outgoing call legs is provided, such as providing concurrent, pyramid, sequential or cascade alerting of the outgoing call legs of a flexible alerting group. As a consequence, use of the present invention avoids potential problems which may arise in flexible alerting groups, and provides greater control and selection concerning how outgoing call legs are alerted and monitored in flexible alerting. The use of the present invention results in a more efficient allocation of resources, both of the consumer and of the service provider. In addition, use of the present invention avoids potential consumer irritation and dissatisfaction which may arise when the various members of a flexible alerting group may not be alerted as desired.

In addition, the apparatus, method and system of the present invention also are user friendly, with the control of the alerting patterns occurring transparently to a user and within a system embodiment. Lastly, the apparatus, method and system are dynamic and responsive to changing environmental and user conditions which may arise in wireline or wireless communication systems, such as potentially changing locations of mobile telephones.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for providing variable alerting patterns for multiple leg telecommunication sessions, the method comprising:
   (a) receiving an incoming call leg designating a primary directory number;
   (b) determining a plurality of secondary directory numbers associated with the primary directory number;
   (c) for each secondary directory number of the plurality of secondary directory numbers, determining a corresponding timing delay parameter, a corresponding no answer time parameter, and a corresponding no answer termination trigger parameter;
   (d) unless a previously routed outgoing call leg has been answered, differentially processing and routing each outgoing call leg associated with each secondary directory number, of the plurality of secondary directory numbers, according to its corresponding timing delay parameter, to form a plurality of outgoing call legs; and
   (e) unless an outgoing call leg of the plurality of outgoing legs has been answered, alerting each outgoing call leg for a time period of its corresponding no answer time parameter and, upon an expiration of the time period, treating each outgoing call leg according to its corresponding no answer termination trigger.

2. The method of claim 1, wherein step (b) further comprises:
   transmitting a location request.

3. The method of claim 1, wherein step (c) further comprises:
   transmitting a location request return result containing, for each secondary directory number of the plurality of secondary directory numbers, the corresponding timing delay parameter, the corresponding no answer time parameter, and the corresponding no answer termination trigger parameter.

4. The method of claim 1, wherein step (d) further comprises:
   (d1) waiting an initial predetermined period of time, determined by a smallest timing delay parameter of a plurality of corresponding timing delay parameters;
   (d2) following the initial predetermined period of time, routing a first outgoing call leg to a first secondary directory number, of the plurality of secondary directory numbers, corresponding to the smallest timing delay parameter;
   (d3) waiting a subsequent predetermined period of time, determined by a next smallest timing delay parameter of the plurality of corresponding timing delay parameters;
   (d4) following the subsequent predetermined period of time, routing a outgoing call leg to another secondary directory number, of the plurality of secondary directory numbers, corresponding to the next smallest timing delay parameter; and
   (d5) repeating steps (d3) and (d4) until a first to occur of either a routing of all outgoing call legs corresponding to the plurality of secondary directory numbers or an answering of an outgoing call leg of the plurality of outgoing call legs.

5. The method of claim 1 wherein the timing delay parameter is a ring start adjustment time contained as a parameter within a Termination List of a modified ANSI compatible LocationRequest RETURN RESULT.

6. The method of claim 1 wherein the no answer time parameter is contained as a parameter within a Termination List of a modified ANSI compatible LocationRequest RETURN RESULT.

7. The method of claim 1 wherein the determination of each corresponding time delay parameter and each corresponding no answer time defines a concurrent alerting pattern for the plurality of outgoing call legs.

8. The method of claim 1 wherein the determination of each corresponding time delay parameter and each corresponding no answer time defines a sequential alerting pattern for the plurality of outgoing call legs.

9. The method of claim 1 wherein the determination of each corresponding time delay parameter and each corresponding no answer time defines a cascade alerting pattern for the plurality of outgoing call legs.

10. The method of claim 1 wherein the determination of each corresponding time delay parameter and each corresponding no answer time defines a pyramid alerting pattern for the plurality of outgoing call legs.

11. The method of claim 1 wherein each corresponding no answer termination trigger is a release of a corresponding outgoing call leg.

12. A system for providing a variable alerting pattern for multiple leg telecommunication sessions, the system comprising:
   a database, the database having stored in a memory a plurality of secondary directory numbers associated with a primary directory number, and for each secondary directory number of the plurality of secondary directory numbers, further storing in the memory a corresponding timing delay parameter, a corresponding no answer time parameter, and a corresponding no answer termination trigger; and a switching center coupled to the database, the switching center further having an interface for receiving an incoming call leg designating the primary directory number and, unless a previously routed outgoing call leg has been answered, for differentially processing and routing each outgoing call leg associated with each secondary directory number, of the plurality of secondary directory numbers, according to its corresponding timing delay parameter, to form a plurality of outgoing call legs; and unless an outgoing call leg of the plurality of outgoing legs has been answered, for alerting each outgoing call leg for a time period of its corresponding no answer time parameter and, upon an expiration of the time period, for treating each outgoing call leg according to its corresponding no answer termination trigger.

13. The system of claim 12, wherein the switching center transmits a location request to the database.

14. The system of claim 12, wherein the database transmits to the switching center a location request return result containing, for each secondary directory number of the plurality of secondary directory numbers, the corresponding timing delay parameter, the corresponding no answer time parameter, and the corresponding no answer termination trigger.

15. The system of claim 12, wherein the switching center waits an initial predetermined period of time, determined by a smallest timing delay parameter of a plurality of corresponding timing delay parameters; following the initial predetermined period of time, the switching center routes a first outgoing call leg to a first secondary directory number, of the plurality of secondary directory numbers, corresponding to the smallest timing delay parameter; and wherein the switching center waits a subsequent predetermined period of time, determined by a next smallest timing delay parameter of the plurality of corresponding timing delay parameters, and following the subsequent predetermined period of time, the switching center routes a outgoing call leg to another secondary directory number, of the plurality of secondary directory numbers, corresponding to the next smallest timing delay parameter, until a sooner to occur of either a routing of all outgoing call legs corresponding to the plurality of secondary directory numbers or an answering of an outgoing call leg of the plurality of outgoing call legs.

16. The system of claim 12 wherein the timing delay parameter is a ring start adjustment time contained as a parameter within a Termination List of a modified ANSI compatible LocationRequest RETURN RESULT.

17. The system of claim 12 wherein the no answer time parameter is contained as a parameter within a Termination List of a modified ANSI compatible LocationRequest RETURN RESULT.

18. The system of claim 12 wherein a specification of each corresponding time delay parameter and each corresponding no answer time defines a concurrent alerting pattern for the plurality of outgoing call legs.

19. The system of claim 12 wherein a specification of each corresponding time delay parameter and each corresponding no answer time defines a sequential alerting pattern for the plurality of outgoing call legs.

20. The system of claim 12 wherein a specification of each corresponding time delay parameter and each corresponding no answer time defines a cascade alerting pattern for the plurality of outgoing call legs.

21. The system of claim 12 wherein a specification of each corresponding time delay parameter and each corresponding no answer time defines a pyramid alerting pattern for the plurality of outgoing call legs.

22. The system of claim 12 wherein each corresponding no answer termination trigger is a release of a corresponding outgoing call leg.

23. The system of claim 12, further comprising:
wherein the database transmits a request to a second switching center for determining a temporary local directory number for a roaming mobile unit corresponding to a secondary directory number of the plurality of secondary numbers.

24. The system of claim 12, wherein the database is a home location register and wherein the switching center is a mobile switching center.

25. An apparatus for providing variable alerting patterns for multiple leg telecommunication sessions, the apparatus comprising:
a network interface for reception of an incoming call leg designating a primary directory number and for transmission of an outgoing call leg;

a memory having a plurality of secondary directory numbers associated with the primary directory number, and for each secondary directory number of the plurality of secondary directory numbers, further having a corresponding timing delay parameter, a corresponding no answer time parameter, and a corresponding no answer termination trigger; and a processor coupled to the memory and the network interface, wherein the processor, when operative, includes program instructions to differentially process and route each outgoing call leg associated with each secondary directory number, of the plurality of secondary directory numbers, according to its corresponding timing delay parameter to form a plurality of outgoing call legs; and the processor having further instructions to, unless an outgoing call leg of the plurality of outgoing legs has been answered, alert each outgoing call leg for a time period of its corresponding no answer time parameter and, upon an expiration of the time period, treat each outgoing call leg according to its corresponding no answer termination trigger.

26. The apparatus of claim 25, wherein the processor includes program instructions to wait an initial predetermined period of time, determined by a smallest timing delay parameter of a plurality of corresponding timing delay parameters, and following the initial predetermined period of time, to route a first outgoing call leg to a first secondary directory number, of the plurality of secondary directory numbers, corresponding to the smallest timing delay parameter; and wherein the processor includes further program instructions to wait a subsequent predetermined period of time, determined by a next smallest timing delay parameter of the plurality of corresponding timing delay parameters, and following the subsequent predetermined period of time, to route an outgoing call leg to another secondary directory number, of the plurality of secondary directory numbers, corresponding to the next smallest timing delay parameter, until a sooner to occur of either a routing of all outgoing call legs corresponding to the plurality of secondary directory numbers or an answering of an outgoing call leg of the plurality of outgoing call legs.

27. The apparatus of claim 25 wherein the timing delay parameter is a ring start adjustment time contained as a parameter within a Termination List of a modified ANSI compatible LocationRequest RETURN RESULT.

28. The apparatus of claim 25 wherein the no answer time parameter is contained as a parameter within a Termination List of a modified ANSI compatible LocationRequest RETURN RESULT.

29. The apparatus of claim 25 wherein a specification of each corresponding time delay parameter and each corresponding no answer time defines a concurrent alerting pattern for the plurality of outgoing call legs.

30. The apparatus of claim 25 wherein a specification of each corresponding time delay parameter and each corresponding no answer time defines a sequential alerting pattern for the plurality of outgoing call legs.

31. The apparatus of claim 25 wherein a specification of each corresponding time delay parameter and each corresponding no answer time defines a cascade alerting pattern for the plurality of outgoing call legs.

32. The apparatus of claim 25 wherein a specification of each corresponding time delay parameter and each corresponding no answer time defines a pyramid alerting pattern for the plurality of outgoing call legs.

33. The apparatus of claim 25 wherein each corresponding no answer termination trigger is a release of a corresponding outgoing call leg.

34. The apparatus of claim 25, wherein the memory is embodied within a home location register and wherein the network interface and the processor are embodied within a mobile switching center.

35. A system for providing variable alerting patterns for outgoing call legs for flexible alerting service, the system comprising:
   a home location register, the home location register having stored in a memory a plurality of secondary directory numbers associated with a pilot directory number, and for each secondary directory number of the plurality of secondary directory numbers, further storing in the memory a corresponding ring start adjustment time (RSAT) parameter, a corresponding no answer time (NAT) parameter, and a corresponding no answer termination trigger; and
   a mobile switching center coupled to the home location register, the mobile switching center further having an interface for receiving an incoming call leg designating the pilot directory number and for differentially processing and routing each outgoing call leg associated with each secondary directory number, of the plurality of secondary directory numbers, according to its corresponding RSAT parameter, to form a plurality of outgoing call legs; and unless an outgoing call leg of the plurality of outgoing legs has been answered, for alerting each outgoing call leg for a time period of its corresponding no answer time parameter and, upon an expiration of the time period, for treating each outgoing call leg according to its corresponding no answer termination trigger.

36. The system of claim 35, wherein the mobile switching center transmits an ANSI compatible LocationRequest to the home location register.

37. The system of claim 35, wherein the home location register transmits to the mobile switching center a modified ANSI compatible LocationRequest RETURN RESULT containing, for each secondary directory number of the plurality of secondary directory numbers, the corresponding RSAT parameter, the corresponding NAT parameter, and the corresponding no answer termination trigger.

38. The system of claim 35, wherein the mobile switching center waits an initial predetermined period of time, determined by a smallest RSAT parameter of a plurality of corresponding RSAT parameters; following the initial predetermined period of time, the mobile switching center routes a first outgoing call leg to a first secondary directory number, of the plurality of secondary directory numbers, corresponding to the smallest RSAT parameter; and wherein the mobile switching center waits a subsequent predetermined period of time, determined by a next smallest RSAT parameter of the plurality of corresponding RSAT parameters, and following the subsequent predetermined period of time, the mobile switching center routes an outgoing call leg to another secondary directory number, of the plurality of secondary directory numbers, corresponding to the next smallest RSAT parameter, until a sooner to occur of either a routing of all outgoing call legs corresponding to the plurality of secondary directory numbers or an answering of an outgoing call leg of the plurality of outgoing call legs.

39. The system of claim 35 wherein the timing delay parameter is a ring start adjustment time contained as a parameter within a Termination List of a modified ANSI compatible LocationRequest RETURN RESULT.

40. The system of claim 35 wherein the no answer time parameter is contained as a parameter within a Termination List of a modified ANSI compatible LocationRequest RETURN RESULT.

41. The system of claim 35 wherein a specification of each corresponding time delay parameter and each corresponding no answer time defines a concurrent alerting pattern for the plurality of outgoing call legs.

42. The system of claim 35 wherein a specification of each corresponding time delay parameter and each corresponding no answer time defines a sequential alerting pattern for the plurality of outgoing call legs.

43. The system of claim 35 wherein a specification of each corresponding time delay parameter and each corresponding no answer time defines a cascade alerting pattern for the plurality of outgoing call legs.

44. The system of claim 35 wherein a specification of each corresponding time delay parameter and each corresponding no answer time defines a pyramid alerting pattern for the plurality of outgoing call legs.

45. The system of claim 35 wherein each corresponding no answer termination trigger is a release of a corresponding outgoing call leg.

46. The system of claim 35, wherein the home location register transmits a request to a serving mobile switching center for determining a temporary local directory number for a roaming mobile unit corresponding to a secondary directory number of the plurality of secondary numbers.

47. The system of claim 46, wherein the home location register transmits an ANSI compatible RoutingRequest to the serving mobile switching center and receives an ANSI compatible RoutingRequest RETURN RESULT from the serving mobile switching center.

* * * * *